(12) United States Patent
Graves

(10) Patent No.: US 7,043,160 B1
(45) Date of Patent: May 9, 2006

(54) METHOD, SYSTEM AND SIGNAL FOR CARRYING OVERHEAD INFORMATION IN A TRANSPORT NETWORK EMPLOYING PHOTONIC SWITCHING NODES

(75) Inventor: Alan F. Graves, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 930 days.

(21) Appl. No.: 09/648,767

(22) Filed: Aug. 28, 2000

(51) Int. Cl.
*H04J 14/08* (2006.01)

(52) U.S. Cl. .............................. 398/98; 341/52; 341/53
(58) Field of Classification Search ............ 398/1–214; 341/52, 53, 56, 58, 92, 81; 375/286; 342/451; 345/40; 370/350; 702/1, 122, 170
See application file for complete search history.

(56) References Cited

U.S. PATENT DOCUMENTS

| | | | | |
|---|---|---|---|---|
| 4,528,550 A | * | 7/1985 | Graves et al. ................ | 341/56 |
| 5,200,979 A | * | 4/1993 | Harris ........................ | 375/292 |
| 5,335,228 A | | 8/1994 | Bottiglieri et al. | |
| 5,619,507 A | * | 4/1997 | Tsuda ........................ | 370/350 |
| 5,767,800 A | * | 6/1998 | Machida et al. ............. | 341/67 |
| 5,857,092 A | * | 1/1999 | Nakamura et al. ............ | 710/62 |
| 6,285,681 B1 | * | 9/2001 | Kolze et al. ................ | 370/442 |
| 6,292,516 B1 | * | 9/2001 | Petsko et al. ............... | 375/267 |
| 6,522,635 B1 | * | 2/2003 | Bedwell ..................... | 370/314 |
| 6,724,996 B1 | * | 4/2004 | Ballintine et al. ............ | 398/98 |

FOREIGN PATENT DOCUMENTS

GB 2243056 A 10/1991

OTHER PUBLICATIONS

Cynthia Kocialski and Joseph D. Harwood: "A primer on digital Wrappers for optical transport networks" Online! Apr. 2000, pp. 1-8, XP002259435.
European Search Report EP 01 30 7120, Nov. 14, 2003.

* cited by examiner

*Primary Examiner*—David C. Payne
(74) *Attorney, Agent, or Firm*—Jeffrey M. Measures; Borden Ladner Gervais LLP

(57) ABSTRACT

A communications signal which carries a purely digital wrapper signal and a method and system for generating it and extracting overhead information therefrom. The wrapper signal can be received by a high-performance format-specific receiver at the end of the network as part of the overall payload, but can also be detected by a low-bandwidth payload-bit-rate-insensitive receiver at an intermediate node. This is achieved by using alternating payload and wrapper segments and providing special digital coding on the wrapper segments. Specifically, each wrapper segment consists of a contiguity of signal level sequences, each of which is a multi-bit symbol that encodes a bit in the overhead bit stream. Each of the symbols is thus a signal level sequence having one of two possible transition patterns, with the appropriate symbol being chosen depending on whether the overhead bit is a logic "zero" or a logic "one". The two symbol patterns which represent logic "zero" and logic "one" each contain enough transitions to meet synchronization and automatic gain control requirements associated with various network equipment, while containing a sufficiently distinct average signal level (or pulse density) to allow a receiver to associate the resultant short-term D.C. offset with the correct wrapper symbol.

59 Claims, 13 Drawing Sheets

METHOD, SYSTEM AND SIGNAL FOR CARRYING OVERHEAD INFORMATION IN A TRANSPORT NETWORK EMPLOYING PHOTONIC SWITCHING NODES

CROSS-REFERENCES TO RELATED APPLICATIONS

The present invention is related in subject matter to co-pending U.S. patent application Ser. No. 09/511,065 to Graves et al., entitled "Switch for Optical Signals", filed on Feb. 23, 2000, assigned to the assignee of the present invention and hereby incorporated by reference herein.

The present invention is also related to the subject-matter of co-pending U.S. patent application Ser. No. 09/580,495, entitled "Optical Switch with Power Equalization", to Graves et al., filed May 30, 2000, assigned to the assignee of the present invention and incorporated by reference herein.

The present invention is further related to the subject-matter of co-pending U.S. Patent Application Ser. No. 60/207,292, entitled "Optical Switch with Connection Verification", to Graves et al., filed May 30, 2000, assigned to the assignee of the present invention and incorporated by reference herein.

FIELD OF THE INVENTION

The present invention relates generally to high-speed transport networks and, more particularly, to the transmission of overhead information through such networks using digital wrapper techniques.

BACKGROUND OF THE INVENTION

With the evolution of transmission and amplification technology, it has become possible for a modern transport network to carry high-speed optical signals for distances of up to 3000 km or more without requiring regeneration. This reach exceeds the spacing between points where it would be convenient to switch or cross-connect the individual wavelength channels, in both metropolitan and long-haul environments. In a metropolitan environment, a convenient distance between switching nodes might typically be 20–50 km, whereas in a long-haul environment it might typically be 60–500 km.

In an optical transport network, it is of importance to verify the integrity of connections made by each switching node, either as a means to build up an end-to-end connectivity check or to provide fault location and diagnosis in the event that an end-to-end check indicates a problem. Accordingly, it is desirable to embed connectivity information within each wavelength channel and then to extract and process this information at the intermediate switching nodes. It is also beneficial to provide each wavelength channel with the capability to carry additional information such as the wavelength origin, the wavelength destination, intermediate routing information, requests for new switched paths, the payload type, the level of service, the level of protection, verification information to permit link quality assessment, a wavelength serial number, etc.

All of the above information can effectively be handled by an overhead bit stream having a bit rate of anywhere from a few kbps to several Mbps. One possible technique for transmitting this overhead information is to endow a payload bit stream with a "wrapper" signal so that the resulting composite signal, which occupies a particular wavelength channel, transports both payload and overhead information related to that wavelength channel. Conventional wrapper signals typically fall into two categories, namely digital and analog.

For instance, one way of transforming a payload bit stream and an overhead bit stream into a composite signal using a conventional digital wrapper is now described with reference to FIG. 1A and FIG. 9. A payload bit stream 100 arrives at a payload buffer 910. The payload bit stream 100 may be any type of digital data stream at the appropriate bit rate. In a SONET environment, the payload bit stream 100 may include either or both of the "SONET payload" and the "SONET overhead" of the SONET signal. In the following, therefore, the expression "payload bit stream" refers to a line signal in a broader sense and its meaning should not be confounded with the meaning of the expression "SONET payload" used to describe part of a SONET signal.

A clock source 920 provides a write clock to the payload buffer 910 at a rate equal to the bit rate of the payload bit stream 100. The output of the payload buffer 910 is read using a read clock at a gapped clock rate, resulting in the creation of a "gapped" bit stream 120 with recurrent gaps 130A–C. The gapped bit stream 120 is fed to an interleaver 930.

Meanwhile, an overhead bit stream 140 (containing the overhead information) arrives at an overhead buffer 940. The clock source 920 provides the overhead buffer 940 with a steady write clock at the overhead bit rate. The output of the overhead buffer 940 is read using a read clock at a "bursty" clock rate, resulting in the creation of a wrapper bit stream 150 composed of recurring wrapper segments 150A–150C. This wrapper bit stream is also fed to the interleaver 930.

At the interleaver 930, each wrapper segment in the wrapper bit stream is inserted into a gap in the gapped bit stream 120. An accelerated clock provided from the clock source 920 can be used to select the appropriate port from which the interleaver 930 is currently reading. By coordinating the acceleration of the overhead bit stream 140 with the acceleration of the payload bit stream 100, the wrapper segments 150A–C can be made to fit precisely into the gaps 130A–C of the gapped bit stream 120. The result is the creation of a composite signal 160 with alternating payload and wrapper segments and having a bit rate which is the sum of the bit rates of the original payload bit stream 100 and the overhead bit stream 140.

A forward error correction (FEC) block 950 is sometimes connected to the output of the interleaver 930 in order to add redundancy to the composite signal 160 prior to transmitting it over an interface.

It should be apparent that in order to recover the payload bit stream 100 and the overhead bit stream 140 at an end node, the receiver used at the end node must be operable at a speed which is sufficiently high to handle the total bit rate of the composite signal 160. Since the composite signal 160 has a bandwidth which is only slightly higher than that of the payload bit stream 100, there is practically no cost increase associated with meeting the detection requirements at the end node when compared with the case where no digital wrapper is used.

However, the overhead information in the overhead bit stream 140 needs to be extracted not just at an end node but also at multiple intermediate nodes along the way. Because the wrapper bits are embedded within the composite signal 160 travelling at the accelerated bit rate, the receiver used at an intermediate node must have the same bandwidth as the receiver used at the end node. In addition, the receiver used at the intermediate node must operate at a sufficiently low bit error rate (BER) to enable the extraction of a reliable overhead bit stream. In practice, modern high-speed transmission systems rely on high-gain forward error correction (FEC) coding systems to achieve this low bit error rate and hence an FEC decode of the entire coded signal (payload and wrapper) would be required at the receiver.

Unfortunately, not only are high-speed, low-BER receivers complex and expensive, but their use at an intermediate node raises issues of network security. Specifically, a switching node that is designed to extract the individual wrapper bits from a composite signal employing a conventional digital wrapper has the inherent capability to "eavesdrop" on the associated payload bit stream. Hence, the use of high-speed receivers at an intermediate node is highly undesirable.

In addition, since the receivers are bit-rate/protocol sensitive, it is necessary to deploy multiple such receivers in parallel at any node which purports to handle a large number of bit-rates and protocols or which is claimed to be protocol independent. Since such receivers require a high level of input optical signal, the input to them would need to be switched and/or amplified.

FIG. 1B illustrates an alternative method of carrying overhead information, which reduces amplification requirements and permits the use of low-speed receivers at an intermediate node. Therein is shown a composite signal 165 resulting from low-intensity modulation of the payload bit stream 100 with a narrowband "analog" wrapper signal 155. The wrapper signal 155 can be a line coded analog signal derived from the signal level of the overhead bit stream 145. Those skilled in the art will appreciate that it is possible to extract the wrapper signal 155 at an intermediate node by accessing the composite signal 165, converting it to electrical form using a low-bandwidth receiver, followed by detection and decoding.

However, the analog wrapper approach has severe limitations of its own. For instance, the superimposition of an intensity-modulated wrapper signal 155 on the payload bit stream 100 results in partial closure of the data "eye" at the end receiver, due to the variation in the signal level of wrapper symbols seen by the receiver. This in turn has the effect of reducing the maximum distance before regeneration of the optical signal is required unless "slow" modulation is applied, in which case the D.C. wander of the composite signal 165 can be compensated for by an automatic gain control circuit at the end receiver. However, slow modulation is associated with a reduction in the information capacity of the overhead bit stream.

In practice, amplifier and receiver automatic gain control loops typically have settling times of 50 microseconds to 1 millisecond, restricting the analog modulation rate to 1–20 kHz if there is to be little or no data eye. This is very limiting and hence systems are usually designed to allow some data eye closure by re-rating the system reach.

Thus, using conventional analog or digital wrapper techniques, it is not possible to provide a sufficiently high-capacity overhead channel on each wavelength channel in such a way that the system reach is not significantly eroded (e.g., beyond a few percent of the maximum in the absence of a wrapper) while permitting the use of low-bandwidth receivers at an intermediate switching node for extraction of the overhead information.

The shortcomings of conventional wrapper-based techniques become even more apparent in the context of a so-called "photonic" switching network, wherein all or part of the switching is performed purely in the optical domain, so that there is very little, if any, conversion of the optical signal back to electronic form. By relaxing the opto-electronic conversion requirements, the use of photonic switching not only reduces costs but also permits de-coupling of the distance between switching points from the distance between electro-optic conversion points.

A generic example of a photonic switching node is now described with reference to FIG. 7, wherein is shown a switching module 720 for switching the optical wavelength channels arriving on a plurality of input optical fibers 710. Each of the input optical fibers 710 carries a wavelength-division multiplexed (WDM) input signal consisting of a plurality of individual composite signals on distinct wavelengths. Each composite signal can be said to occupy a respective wavelength channel and may be associated with any one of a number of different payload bit rates. The switched wavelength channels at the output of the switching module 720 are recombined into WDM signals and provided on a plurality of output optical fibers 740.

The switching module 720 contains a photonic switching core 722 and, optionally, a wavelength converting switch 724 connected thereto. The photonic switching core 722 receives WDM signals on the input optical fibers 710 and on a plurality of optical fibers 730 arriving from the wavelength converting switch 724. The signals carried by the optical fibers 730 may or may not be WDM signals. The photonic switching core 722 comprises optical components for separating any WDM input signals present on the optical fibers 710, 730 into their individual wavelength channels.

The photonic switching core 722 also comprises optical components for switching the separated wavelength channels entirely in the optical domain by using any known optical switching technology, for example arrays of micro-mirrors moved or steered by a micro-electro-mechanical structure, for example.

At its output end, the photonic switching core 722 comprises optical components for recombining groups of switched wavelength channels into WDM output signals which are then output onto the plurality of output optical fibers 740. Other switched wavelength channels are fed back into the wavelength converting switch 724 along a plurality of optical fibers 750. The photonic switching core 722 may comprise optical components for combining individual switched wavelength channels into WDM signals before providing them to the wavelength converting switch 724 along the optical fibers 750.

Those skilled in the art will appreciate that the normal "through path" for a wavelength channel as it travels across a photonic network is from the appropriate input fiber 710 through the photonic switching core 722 to the appropriate output fiber 740 without interaction with the wavelength converting switch 724. However, if onward propagation is blocked at the original wavelength or because optical impairments have built up to the point where regeneration is necessary, then the wavelength channel may pass through the wavelength converting switch 724.

Also, the wavelength converting switch 724 is used for providing an optical line signal at its launch point in the first place or for terminating it at its destination. Thus, a plurality of launch signals, possibly in WDM format, arrive at the wavelength converting switch 724 along a plurality of "add" optical fibers 760. In addition, a plurality of terminated signals, possibly in WDM format, leave the wavelength converting switch 724 along a plurality of "drop" optical fibers 770. The add and drop signals could be optical WDM, optical short reach (such as parallel optical interface, e.g., Infineon PAROLI) or electrical.

Structurally, the wavelength converting switch 724 provides optical components for separating any WDM signals present on the optical fibers 750, 760 into their individual wavelength channels, as well as electrical circuitry for electrically switching these channels. Some of the switched wavelength channels are provided to the photonic switching core 722 along the plurality of optical fibers 730. Other switched wavelength channels are provided as "drop" signals to an external destination via a plurality of optical fibers 770.

To extract overhead information at the switching node, the input optical fibers 710 are intercepted by a respective plurality of optical tap couplers 780. The signals tapped in this way are WDM optical signals. The individual wavelength channels in each tapped WDM optical signal can then be isolated using a front end 790. At the output of the front end 790, there is connected an information extraction system bank 792 which includes multiple format-specific optoelectronic receivers whose electrical bandwidth of operation depends on the bandwidth of the wrapper signal carrying the overhead information. The information extraction system bank 792 is connected to a processing module 796.

Various possible implementations of the front end 790 are described in the above-referenced co-pending applications, namely Ser. No. 09/580,495 and Ser. No. 60/207,292. However, not all of these front end configurations would be suitable for use with signals which carry overhead information. Specifically, since it may be desirable to provide continual monitoring of overhead information on each wavelength channel, the most suitable configurations of the front end 790 are those which provide separation of each tapped WDM signal into its individual wavelength channels.

Regarding the information extraction system bank 792, a sufficient number of information extraction systems (such as the one shown at 1000 in FIG. 10) must be provided in order to extract the overhead information for each individual wavelength channel. Each comprises a receiver portion 1005 connected to an FEC decode block 1040, which is connected to a high-speed frame find module 1050 and a high-speed wrapper expander 1060.

When used with conventionally wrapped digital signals, the information extraction system 1000 presents a number of disadvantages which are now described. Firstly, in a practical multi-purpose multi-bitrate networking scenario, it is highly unlikely that the wrapper information on each wavelength channel will have a common bit rate, since the received wrapper data rate is largely dependent upon the payload data rate (which may range from OC-3 at 155 Mbps to OC-768 at nearly 40 Gbps and above). Therefore, there must be a sufficient number of format-specific receivers 1010 in the information extraction system 1000 to accommodate the various wrapper information bit rates.

Secondly, the information contained in a conventional digital wrapper must be received at the bit rate of the composite signal, which can be very high (in the multi-Gpbs range, for example). Thus, the format-specific receivers 1010 in the information extraction system 1000 must operate at a very high bandwidth and such receivers are more expensive than their narrower-bandwidth counterparts.

Moreover, the complexity of the front end increases because now the front end 790 must output the wavelength channels to the appropriate receiver 1010 based on the bit rate of that channel's payload bit stream. Hence, a demultiplexer 1020 and a multiplexer 1030 would be required. Also, the system 1000 is inflexible as additional receivers would be required in the receiver bank 792 for each newly introduced composite signal bandwidth.

Finally, due to the configuration of the front end 790, which provides one signal for each wavelength channel, a very large number of information extraction systems 1010 (each with multiple format-specific, high-bandwidth receivers) would be required.

On the other hand, the use of an analog wrapper in a photonic switching scenario is also impractical for various reasons, most notably due to the extreme limitations in communication bandwidth noted earlier if link performance penalties are to be avoided, as well as the presence of the wavelength converting switch 724. Simply put, the overhead information carried by an analog wrapper signal forming part of a given composite signal will be lost if the signal passes through the wavelength converting switch 724, unless the analog wrapper is detected at the input of the wavelength converting switch 724 and then re-superimposed on the appropriate signal at the output of the wavelength converting switch 724. However, the added complexity of performing this operation is a disadvantage which compounds the disadvantages arising from the analog wrapper's generally low information capacity.

It should therefore be apparent that the problems associated with carrying and extracting overhead information using conventional analog and digital wrapper techniques in a high-speed transport network are exacerbated when the transport network is equipped with photonic switching nodes.

SUMMARY OF THE INVENTION

It would therefore be an advantage to provide a communications signal designed in such a way that the overhead information can be extracted at an intermediate node using low-bandwidth receivers.

It would be a further advantage to allow extraction of the control information using receivers and decoders whose design and performance are independent of the bit rate of the payload bit stream.

It would be another advantage if the communications signal were designed in such a way that the system reach is not significantly degraded with respect to the case in which there is an absence of overhead information.

It would be yet another advantage to provide an overhead information extraction system for re-creating a stream of wrapper symbols, which can correctly detect the wrapper symbols without necessarily having to correctly detect each bit in each wrapper symbol.

The present invention presents a purely digital method of providing a wrapper signal which can be received by a high-performance format-specific receiver at the end of the network as part of the overall payload, but which can also be detected by a low-bandwidth payload-bit-rate-insensitive receiver at an intermediate node. This is achieved by using alternating payload and wrapper segments, but by providing special digital coding on the wrapper segments.

Specifically, each wrapper segment consists of a contiguity of signal level sequences, each of which is a multi-bit symbol that encodes a wrapper channel bit in an overhead bit stream. Each of the symbols is a signal level sequence having one of two possible transition patterns, with the appropriate symbol being chosen depending on whether the overhead bit is a logic "zero" or a logic "one".

The two symbol patterns which represent logic "zero" and logic "one" are specially designed. They each contain enough transitions to meet synchronization requirements associated with various network equipment, while containing a sufficiently distinct average signal level (or pulse density) to allow a low-bandwidth receiver at an intermediate node to associate the resultant short-term D.C. offset with the correct wrapper symbol. Additional transitions may be inserted to effects of a long-term D.C. offset on the performance of automatic gain control systems.

The invention may therefore be summarized according to a first broad aspect as a communications signal embodied in a transmission medium and for use in a communications network, including recurring wrapper bursts, each wrapper burst having one or more wrapper symbols, each of which corresponds to an information bit. Each wrapper symbol is characterized by a signal level transition pattern which is either a first pattern or a second pattern depending on the logic value of the respective information bit. Furthermore, the first and second patterns each have a distinct average signal level and further have at least one signal level transition.

According to a second broad aspect, the invention may be described as a communications signal embodied in a transmission medium, including alternating payload and wrapper segments, wherein each wrapper segment includes a contiguity of signal level sequences, wherein each signal level sequence has an average signal level indicative of the binary value of a bit of an overhead bit stream, and wherein each signal level sequence has at least one intermediate signal level transition.

The invention may be summarized according to a third broad aspect as a communications signal embodied in a transmission medium, including alternating payload and wrapper segments, each wrapper segment consisting of a concatenation of binary signal level patterns. Each binary signal level pattern is associated with a bit of an overhead bit stream and each binary signal level pattern is either a first pattern or a second pattern, the first and second patterns being associated with respective ones of the two possible logic values for a bit in the overhead bit stream. The first pattern consists mostly of a low signal level and partly of a high signal level and the second pattern consists mostly of the high signal level and partly of the low signal level.

According to a fourth broad aspect, each wrapper segment would include a concatenation of pulse sequences, each pulse sequence encoding a bit of an overhead bit stream, with the pulse sequence which encodes one of two possible logic values for a bit in the overhead bit stream consisting of at least one pulse and having a pulse density of strictly less than 50 percent, and with the pulse sequence which encodes the other of two possible logic values for a bit in the overhead bit stream consisting of not all pulses and having a pulse density of strictly more than 50 percent.

The invention may be summarized according to a fifth broad aspect as a method of extracting an overhead bit stream from a composite optical signal having the above-mentioned characteristics. The method includes the steps of converting the composite optical signal into an electrical signal having an electrical bandwidth that is substantially less than the bandwidth of the high-speed data stream; locating the position of successive wrapper segments in the low-bandwidth electrical signal; and detecting individual bits of the overhead bit stream from the low-bandwidth electrical signal.

According to a sixth broad aspect, the invention may be summarized as a system for extracting an overhead bit stream from an optical signal having the above-mentioned properties. The system includes a receiver for converting, the composite optical signal into an electrical signal having an electrical bandwidth that is substantially less than the bandwidth of the high-speed data stream. The system also includes a wrapper segment identifier connected to the receiver, for locating the position of successive wrapper segments in the low-bandwidth electrical signal. Finally, the system includes a detector connected to the wrapper segment identifier, for detecting individual bits of the overhead bit stream from the low-bandwidth electrical signal.

The invention may be summarized according to a seventh broad aspect as a method of generating a composite communications signal from a payload bit stream and an overhead bit stream. The method includes the steps of transforming the payload bit stream into a gapped bit stream and transforming the overhead bit stream into a sequence of bursts which fit into the gaps of the gapped bit stream. The step of transforming includes mapping each overhead bit into a wrapper symbol which is represented by either a first signal level pattern or a second signal level pattern depending on the logical value of the overhead bit. Also, the first and second signal level patterns each have a distinct average signal level and are characterized by at least one signal level transition.

According to an eight broad aspect, the invention may be summarized as a system for generating a composite communications signal from a payload bit stream and an overhead bit stream. The system includes a clock source for producing a gapped payload clock signal and a bursty wrapper clock signal, a payload buffer connected to the clock source, the payload buffer receiving the payload bit stream at a constant rate and being read from at the rate of the gapped payload clock signal, thereby to produce a gapped bit stream comprising recurrent gaps.

The system also includes a wrapper symbol coder, for mapping each overhead bit into a wrapper symbol which is represented by either a first signal level transition pattern or a second signal level transition pattern depending on the logical value of the overhead bit and wherein the first and second signal level transition patterns each have a distinct average signal level and are each characterized by at least one signal level transition. The system further includes a wrapper buffer connected to the clock source and to the wrapper symbol coder, the wrapper buffer receiving the wrapper symbols at a constant rate and being read from at the rate of the bursty wrapper clock signal, thereby to produce a series of bursts. Finally, an interleaver connected to the payload buffer and to the wrapper buffer inserts the bursts at the output of the wrapper buffer into respective gaps in the output of the payload buffer.

The invention may be summarized according to a ninth broad aspect as a wrapper symbol coder for mapping each of a plurality of overhead bits into a wrapper symbol, the coder being operable to produce either a first signal level transition pattern or a second signal level transition pattern depending on the logical value of each overhead bit, wherein the first and second signal level transition patterns are each characterized by having a distinct average signal level and are each further characterized by at least one signal level transition.

BRIEF DESCRIPTION OF THE DRAWINGS

These and other aspects and features of the present invention will now become apparent to those of ordinary skill in the art upon review of the following description of specific embodiments of the invention in conjunction with the accompanying drawings, in which.

DETAILED DESCRIPTION OF THE PREFERRED EMBODIMENTS

Figure 2:
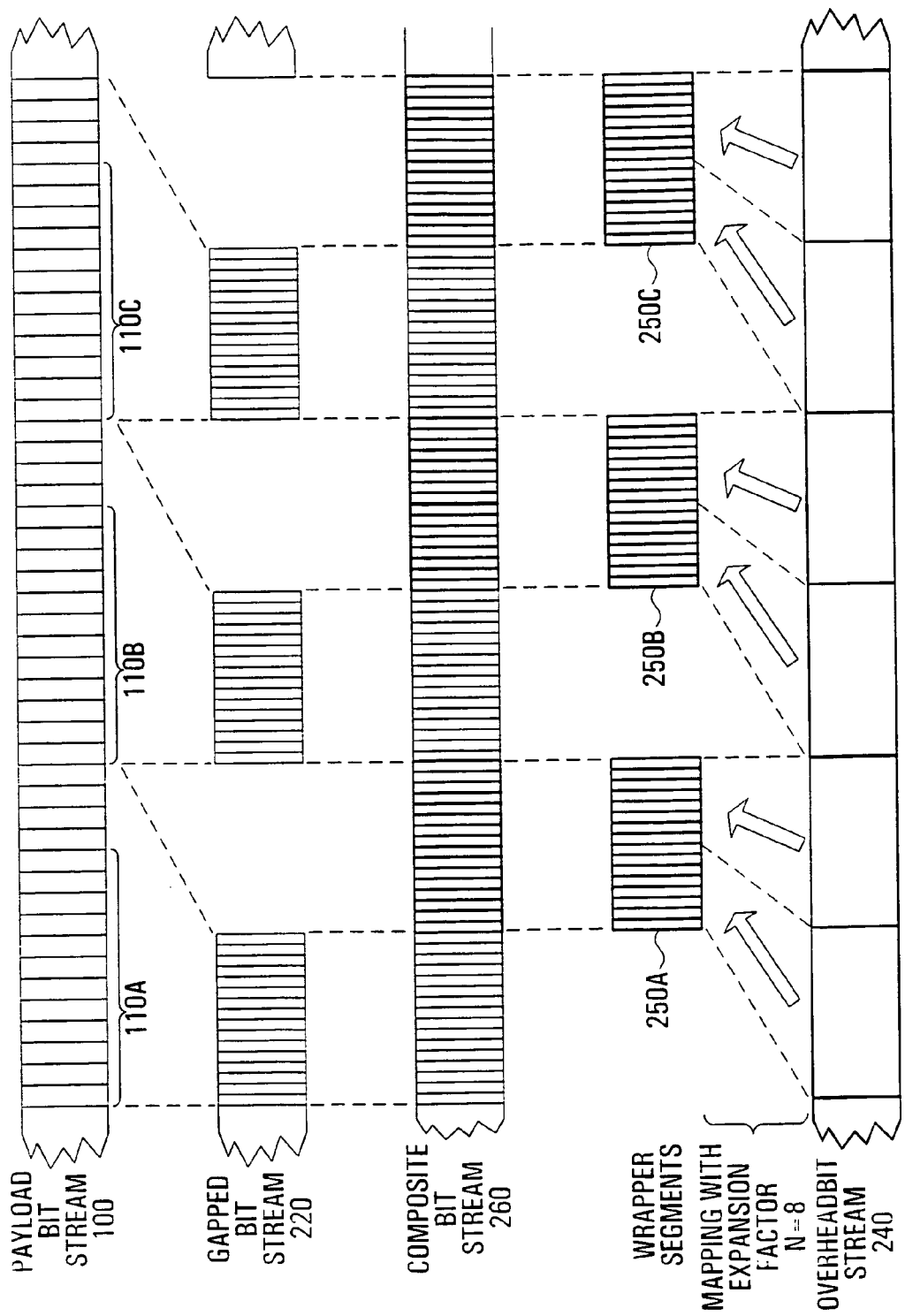
FIG. 2 shows the format of a communications signal equipped with a wrapper in accordance with an embodiment of the present invention.

FIG. 2 shows the format of a composite signal 260 which carries payload information and overhead information in accordance with an embodiment of the present invention. As was the case with the previously described composite signal 160, the composite signal 260 comprises alternating payload and wrapper segments, each of which consists of an arrangement of bits.

Figure 1A:
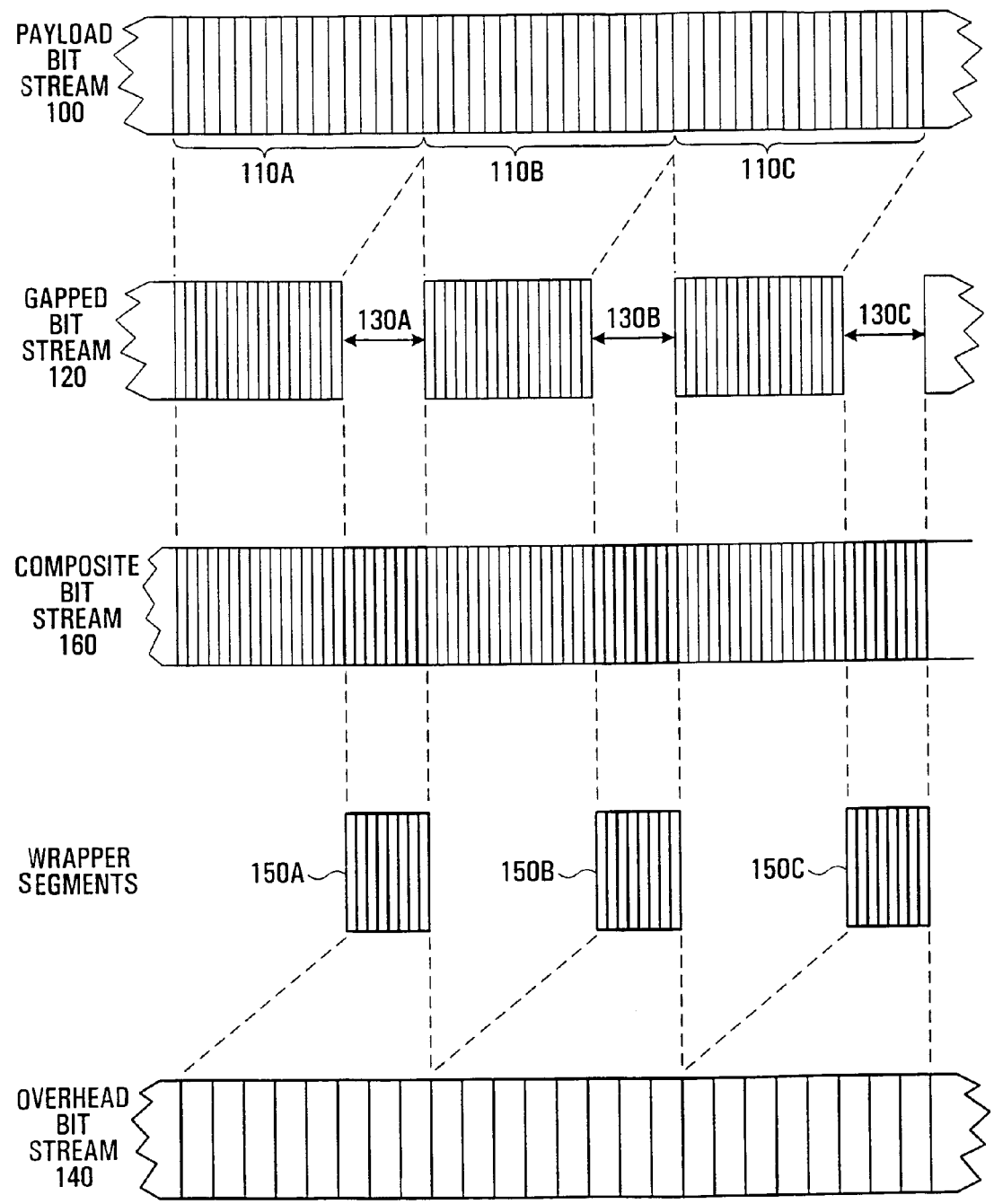
FIG. 1A shows the format of a communications signal equipped with a conventional digital wrapper.
Figure 1B:
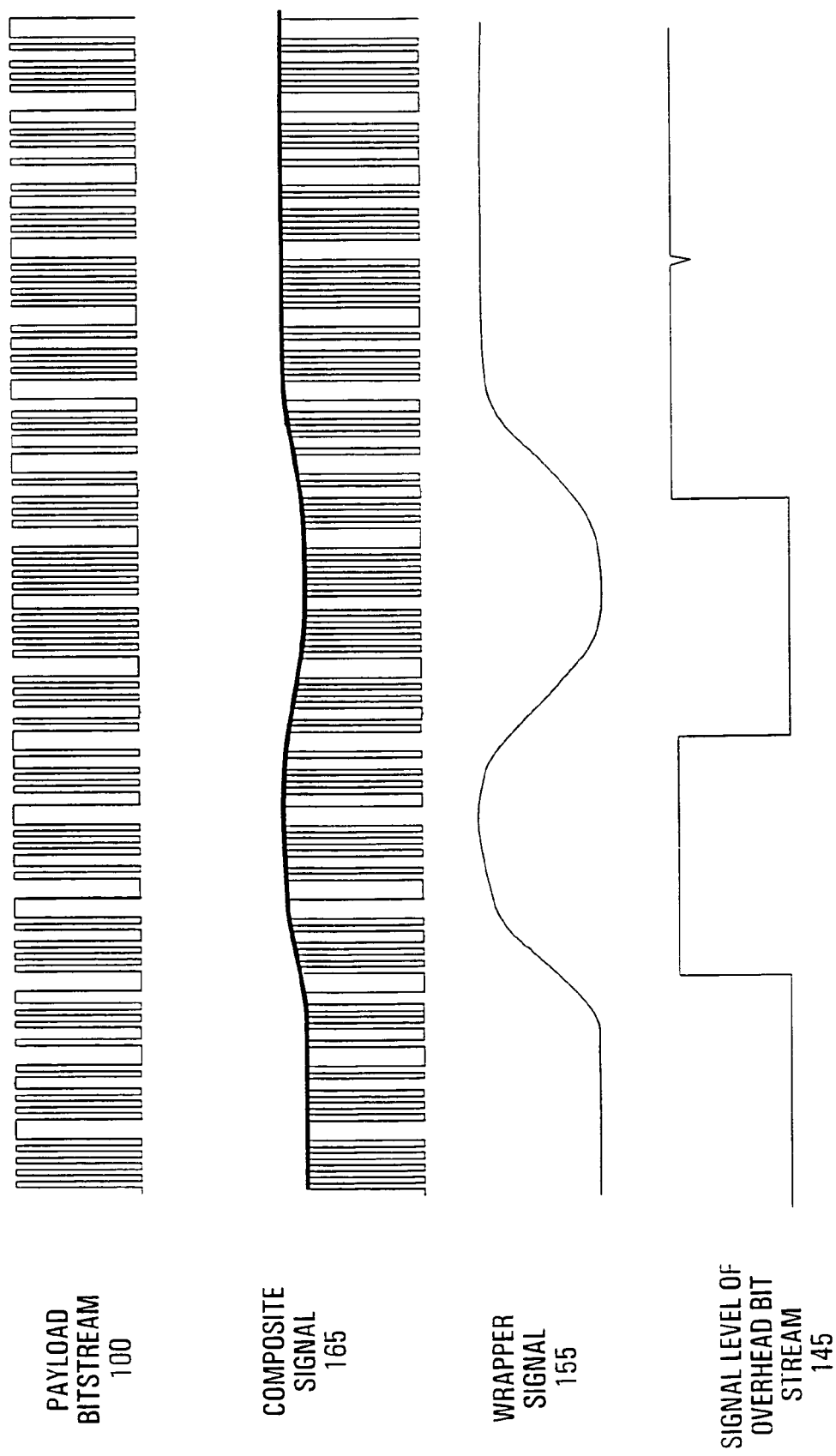
FIG. 1B shows the format of a communications signal equipped with a conventional analog wrapper.

However, in contrast to the composite signal 160 of FIG. 1, individual wrapper bits in a given one of the wrapper segments 250A–C in the composite signal 260 do not correspond to respective individual bits in the overhead bit stream 240. Rather, each bit in the overhead bit stream 240 is associated with an N-bit wrapper symbol. Thus, each wrapper segment 250A–C will consist of a contiguity of one or more wrapper symbols, with each N-bit wrapper symbol being associated with a single, respective bit in the overhead bit stream.

Figure 11:
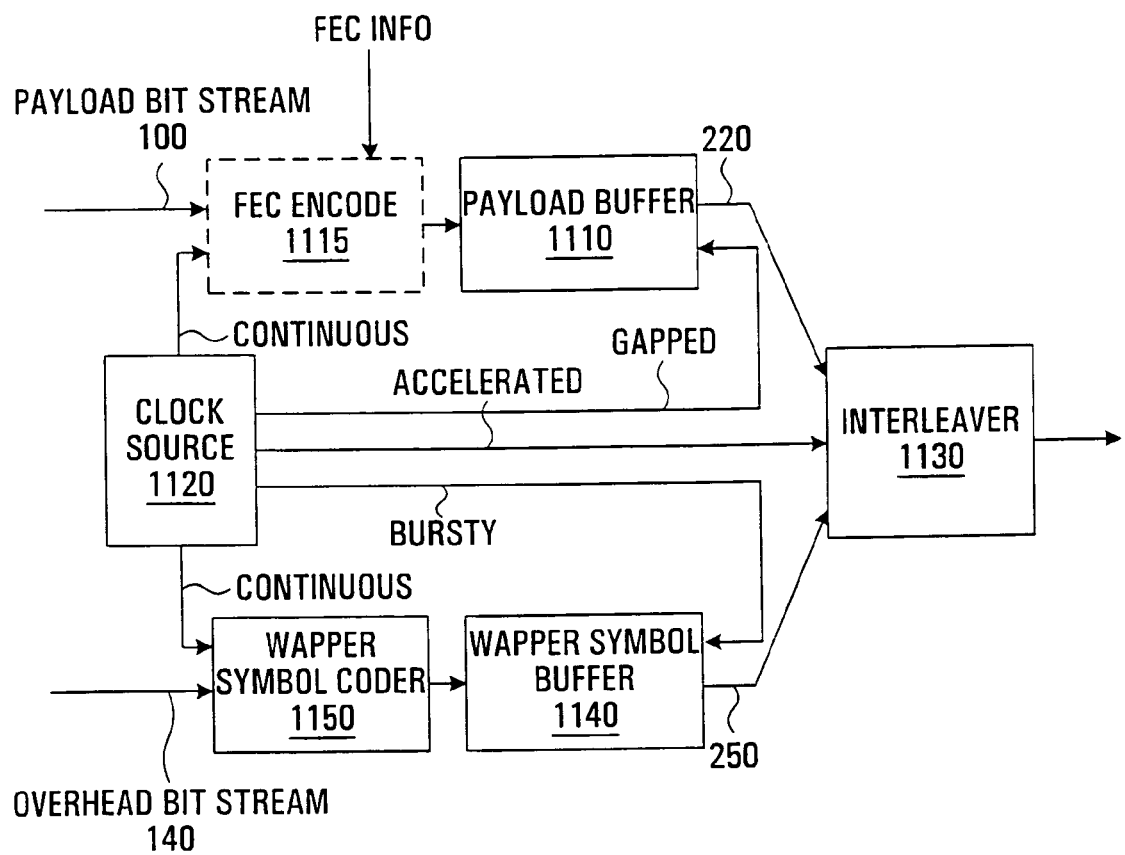
FIG. 11 is a block diagram of a digital wrapper generation system according to an embodiment of the present invention.

A system for creating a digitally wrapped signal in accordance with an embodiment of the invention is now described with reference to FIG. 11. The payload bit stream 100 arrives at a payload buffer 1110, possibly via an optional FEC encoder 1115. A clock source 1120 provides a write clock to the payload buffer 1110 at a rate equal to the bit rate of the payload bit stream 100. The output of the payload buffer 1110 is read using a read clock at a gapped clock rate, resulting in the creation of a "gapped" bit stream 220 which is fed to an interleaver 1130.

Meanwhile, the overhead bit stream 140 arrives at a wrapper symbol coder 1150 which is written to at the overhead bit rate based on a steady clock provided by the clock source 1120. The wrapper symbol coder 1150 maps each overhead bit into an N-bit wrapper symbol. The output of the wrapper symbol coder 1150 is fed to an overhead buffer 1140. (Of course, the wrapper symbol coder 1150 and the wrapper symbol buffer 1140 could be interchanged.) The output of the wrapper symbol buffer 1140 is read using a read clock at a "bursty" clock rate (equal to N times the wrapper symbol rate), resulting in the creation of a wrapper bit stream 250 composed of recurring wrapper segments 250A–250C. The wrapper bit stream 250 is also fed to the interleaver 1130.

At the interleaver 1130, as before, each wrapper segment in the wrapper bit stream 250 is inserted into a gap in the gapped bit stream 220. An accelerated clock provided from the clock source 1120 can be used to select the appropriate port from which the interleaver 1130 is currently reading.

The relationship between the overhead bits and the wrapper bits can be expressed as having three properties. Property (1) is that each overhead bit is mapped to one of two possible wrapper symbols, each of which is a set of "N" wrapper bits which are arranged in a pattern that depends on the logic value of the overhead bit. Property (2) is that the two possible wrapper symbols, when integrated over a symbol period, have a sufficiently distinct average (or D.C.) value to allow a low-bandwidth receiver to distinguish between them. Finally, property (3) is that each of the two possible wrapper symbols has one or more signal level transitions somewhere between the start and end of the symbol.

Property (1) can be viewed as a mapping of the overhead bits to the wrapper bits using an expansion factor of "N". In FIG. 2, N is equal to eight, but N can generally have any desired value. In fact, depending on the value of "N" and on the bit rates of the payload bit stream and the overhead bit stream, there will result a particular overall bit rate increase when moving from the bit rate of the payload bit stream to the bit rate of the composite (payload+wrapper) signal. Specifically, the percent increase in the bit rate of the composite signal (denoted "INCREASE") is related to the expansion factor "N", to the bit rate of the payload bit stream (denoted "$BW_P$") and to the bit rate of the overhead bit stream (denoted "$BW_O$") in the following manner:

$$INCREASE = 100 \times N \times BW_O/BW_P.$$

Those skilled in the art should appreciate that by varying the expansion factor "N", it is possible to control the percent increase in bandwidth over a wide range of payload and overhead bit rates so that the percent increase is limited to within a specified lower range. Alternatively, control of the expansion factor "N" can be used to maintain a common symbol rate for the wrapper symbols over a wide range of payload or overhead bit rates, so that a single type of wrapper symbol receiver can be used at an intermediate node, irrespective of payload bit rate, protocol or format.

While any integer value of the expansion factor which is greater than unity is within the scope of the present invention, it may be desirable to choose a value of "N" which keeps the overall bit rate increase to within a certain percentage. This is because increases in the bit rate of the composite signal have the effect of reducing the system reach (although very slight increases can be compensated for by forward error correction). It is expected that an overall bit rate increase of 5% or less would be acceptable, although it is within the scope to provide an even greater bit rate increase.

The impact of property (2) above is now described. Specifically, because of the reliance upon an average signal level within a symbol interval and because this average signal level for each of the two possible symbol patterns is distinct, there is no need to correctly detect each individual bit in each wrapper segment. Rather, in order to conclude which overhead bit was transmitted, all that is required is the ability to correctly determine whether the average signal level, when integrated by the low pass response of the receiver, is above or below a threshold and to do this only once per wrapper symbol. Since each individual wrapper bit need not be resolved into a "1" or a "0", there is no need to perform forward error correction.

Figure 10:
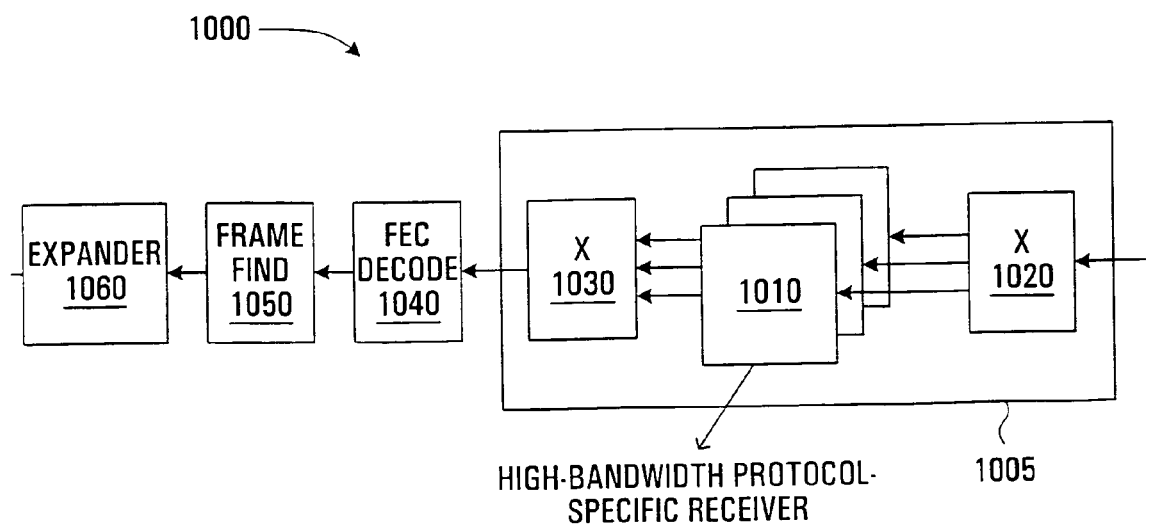
FIG. 10 is a block diagram of a conventional digital wrapper reception system.

Thus, reception and detection of overhead information is greatly simplified at an intermediate node with respect to the system of FIG. 10. Firstly, wide-bandwidth receivers are no longer necessary: it is now possible to use a receiver with a low-pass characteristic having a cut-off point at $1/N^{th}$ the bandwidth of the composite signal 260. Secondly, the detector used for converting the low-pass filtered signal into bits can be a simple threshold detector which operates once per symbol interval.

By way of example, if the overall bit rate increase is limited to 5%, and assuming a payload bit rate of 10 Gbps and an overhead bit rate of 1 Mbps, the value for the expansion factor "N" would be 500. This is because a 5% increase from 10 Gbps is equivalent to a 500 Mbps wrapper bit rate, but since the overhead bit rate is only 1 Mbps, each overhead information bit can be expanded into 500 wrapper bits. This allows the use of a ($\frac{1}{500} \times 10.5$ Gbps=) 21 Mbps receiver at an intermediate node. This is contrasted with the 10.001 Gbps receiver which would be required if a conventional digital wrapper (with an overhead bit rate of 1 Mbps on top of the payload bit rate of 10 Gbps) were used.

A further advantage of the invention is that wrapper receiver transparency can be maintained for various payload bit rates, simply by varying the expansion factor "N". Specifically, it is possible to adjust the expansion factor "N" in such a way that the same low-bandwidth receiver which was used for one payload/overhead scenario can also be used for another payload/overhead scenario. For instance, when the payload bit rate is 2.48832 Gbps and when the overhead bit rate is 1 Mbps, an expansion factor of N=124 would require a receiver having a bandwidth of ($\frac{1}{124} \times$ 2.61232 Gbps=) 21.1 Mbps, which is very close to 21 Mbps.

Certainly, both scenarios can be handled by a receiver with less than 100 Mbps bandwidth, which is compatible with current low cost receiver array technology, whereas the use of a conventional digital wrapper would necessitate a 10.001 Gbps receiver or a 2.48932 Gbps receiver. Thus, it is clear that the invention not only allows the use of a low-bandwidth receiver but also the receiver can be payload bit rate independent, simply through appropriate selection of the expansion factor "N".

In the present invention, "N" wrapper bits are associated with each overhead bit and therefore the maximum theoretical improvement in detection performance with respect to the detection of individual bits at the bit rate of the composite signal is on the order of 10 $\log_2 N$ decibels (dB) There is, however, an upper limit to the difference between the two average signal levels which is permissible by the inventive wrapper.

Specifically, it is not acceptable to use the two most extreme symbol patterns, namely "all low signal level" or "all high signal level". Otherwise, a string of zeroes (or ones) in the overhead bit stream would cause the occurrence of a prolonged interval at a constant signal level. Since many equipment modules such as end receivers are designed to tolerate a sequence of up to 15 or 31 consecutive bit intervals (of the composite signal) at the same signal level but tend to lose synchronization afterwards, it is necessary to limit the number of consecutive wrapper bits which have the same signal level in order to not adversely affect the system reach.

Thus, property (3) above states that each of the two N-bit symbol patterns must contain one or more intermediate signal level transitions. In other words, it is necessary to cause a rising or falling edge to occur at least once within the boundaries of each symbol pattern. As downstream switches and regenerators will now be guaranteed to encounter at least one rising or falling edge within each set of "N" wrapper bits, regardless of the string of logical values in the overhead bit stream, synchronization can be maintained more easily by such equipment.

Those skilled in the art should also appreciate that when the expansion factor "N" is greater than the number of consecutive constant-level bit intervals which can be supported by network equipment, it may be necessary to limit the number of consecutive bits which are permitted to have the signal level within the same wrapper symbol. In other words, it may be necessary to force the occurrence of more than one signal level transition within each N-bit wrapper symbol. This can be achieved by specially designing the two symbol patterns such that wrapper bits of an opposite polarity appear at strategic locations within the symbol pattern.

There may be other reasons for introducing polarity changes within a wrapper symbol. For instance, if an automatic gain control system is used at the end receiver, such a system will adapt to changes in the average signal level of the composite signal as a whole. Depending on the relative duration of a wrapper segment, it may be necessary to introduce strategically placed signal level transitions within each symbol pattern in order to avoid overly biasing the automatic gain control system.

Figure 3A:
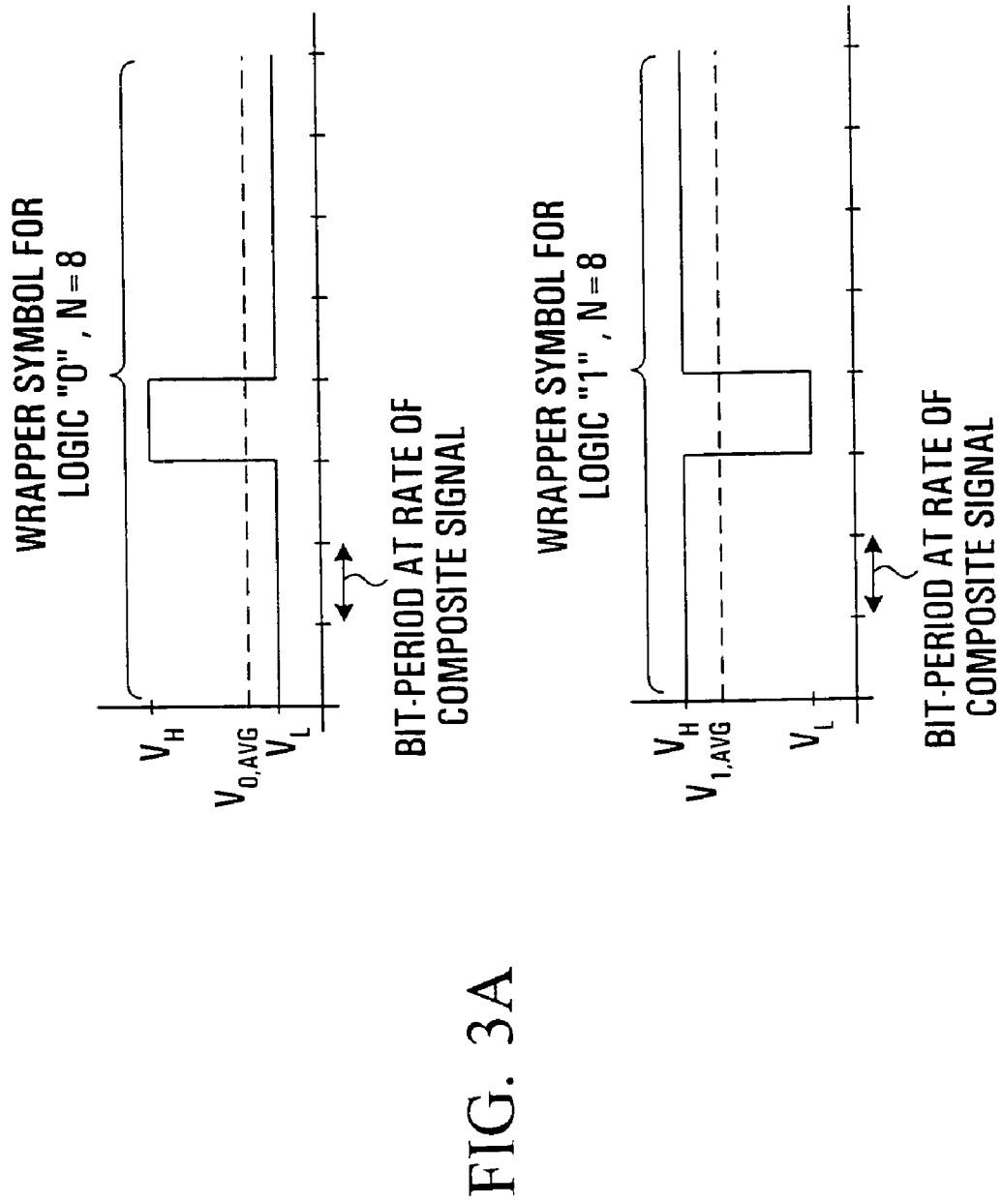
FIGS. 3A–3C show various pairs of symbol patterns in accordance with specific embodiments of the present invention.
Figure 3B:
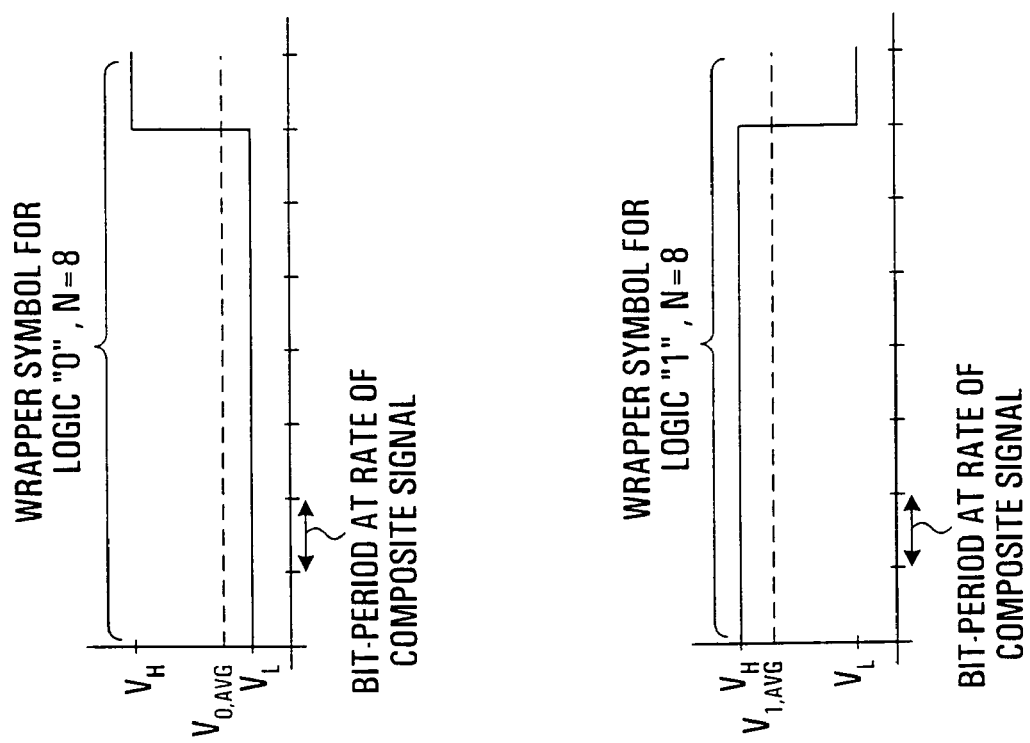
Figure 3C:
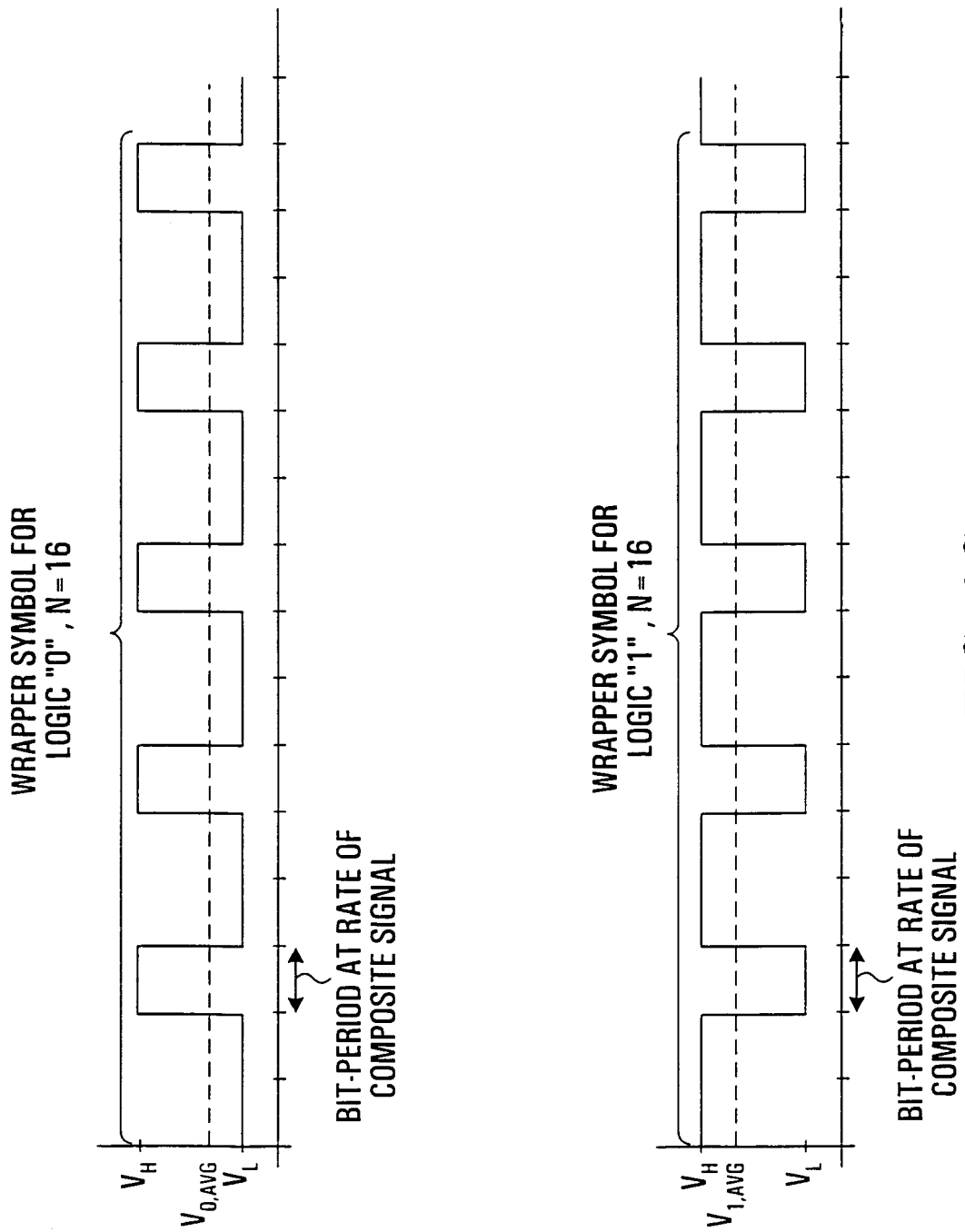

By way of example, FIGS. 3A–3C show various pairs of symbol patterns meeting having properties (1), (2) and (3) above. The symbol patterns in each case are shown as complementary for logic zero and logic one but they need not be. Also, although not shown, there may be more than two possible N-bit symbol patterns, each with its own distinct average signal level, if it is desired to transmit a greater amount of overhead information per second and if the detection device at the intermediate node is sufficiently robust to handle the more closely spaced average signal levels.

With reference to FIG. 3A, there is shown a wrapper symbol for a logic "zero" and another wrapper symbol for a logic "one". The expansion factor in this example is 8, which means that each wrapper symbol corresponds to 8 wrapper bits. The logic "zero" symbol has mostly a low signal level $V_L$ with two signal level transitions defining a single pulse at a high signal level $V_H$. The average signal level of the logic "zero" symbol, denoted $V_{AVG,0}$, lies at $V_L + \frac{1}{8} \times (V_H - V_L)$. The logic "one" symbol is complementary to the logic "zero" symbol and lies mostly at $V_H$ with a pair of signal level transitions defining a single recess at $V_L$. The average signal level of the logic "one" symbol, denoted $V_{AVG,1}$, lies at $V_L + \frac{7}{8} \times (V_H - V_L)$.

With reference to FIG. 3B, there is depicted another pair of wrapper symbols for a logic "zero" and for a logic "one". The expansion factor is again 8, which means that each wrapper symbol corresponds to 8 wrapper bits. Here, the logic "zero" symbol is mostly at $V_L$ but has a rising edge at the end of the symbol. The average signal level of the logic "zero" symbol, denoted $V_{AVG,0}$, lies at $V_L + \frac{1}{8} \times (V_H - V_L)$. The logic "one" symbol is complementary to the logic "zero" symbol; it lies mostly at $V_H$ and has a falling edge at symbol's end. Thus, it is seen that each of the two wrapper symbols has only a single signal level transition, as opposed to the symbols in FIG. 3A which had two transitions each, one from a "zero" to a "one" and another from a "one" to a "zero".

FIG. 3C shows yet another pair of wrapper symbols for a logic "zero" and for a logic "one". In this case, the expansion factor is 16, implying that each wrapper symbol is mapped to a sequence of 16 wrapper bits. This time, the logic "zero" symbol lies at a $V_L$ for 68.75% of the time and at a $V_H$ for 31.25% of the time. It has an average value of $V_{AVG,0} = V_L + \frac{5}{16} \times (V_H - V_L)$. The logic "one" symbol is complementary to the logic "zero" symbol. Each of the two wrapper symbols has multiple single signal level transitions.

For each symbol pair, the percentage of the difference between $V_L$ and $V_H$ which is taken up by the difference between $V_{AVG,1}$ and $V_{AVG,0}$ is an indication of the discrimination accuracy required at a threshold detector. In general, the greater this percent "separation", the easier it is for a threshold discriminator to successfully categorize the average value of a noisy received symbol as either a zero or a one. By way of example, both FIGS. 3A and 3B show symbol pairs with a percent separation of 7/8−1/8=75%. In contrast, the symbol pair in FIG. 3C has a percent separation of only 68.75%−31.25%=37.5%.

Although a large percent separation is desirable for facilitating the detection process, the presence of signal level transitions reduces this separation and therefore increases the probability that the detector will make an error in detecting a logic "zero" or a logic "one". Thus, the higher the percentage of wrapper bits inverted in order to limit the number of consecutive wrapper bits having the same polarity within the same N-bit symbol pattern, the smaller the difference between the average signal levels of the two symbol patterns. This, in turn, reduces the decision threshold margin between detecting a valid wrapper logic "1" or "0" and increases the probability of false triggering due to background noise or low-frequency payload components.

However, at least one signal level transition is necessary in each symbol for reasons such as maintaining synchronization of downstream network equipment.

Figure 8:
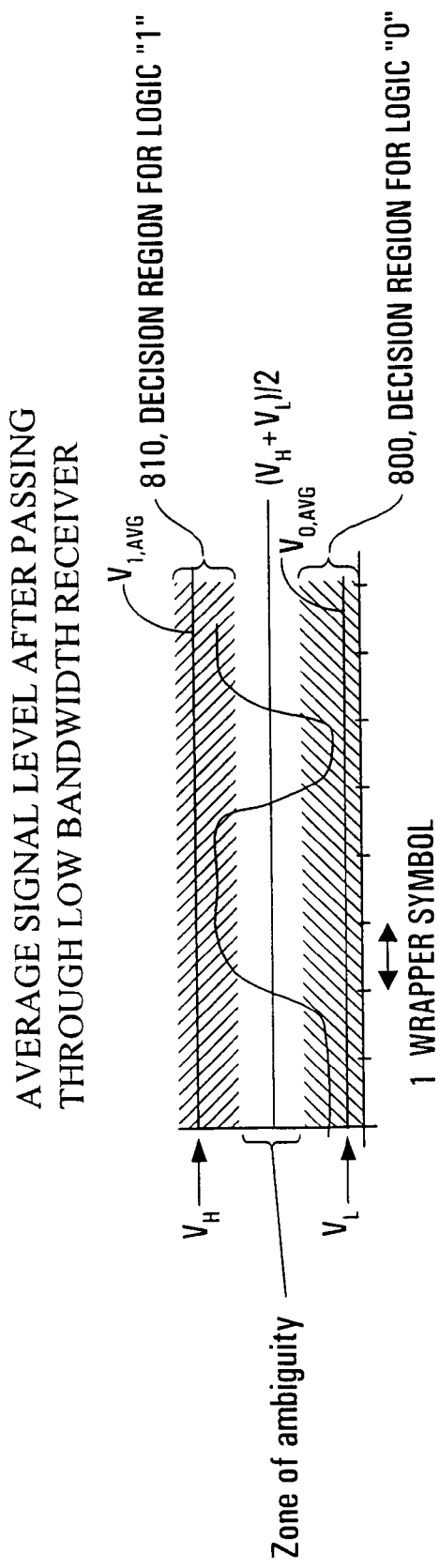
FIG. 8 shows the time-varying signal level of a sample output from a low-bandwidth receiver in relation to the logic "zero" and logic "one" detection regions.
Figure 9:
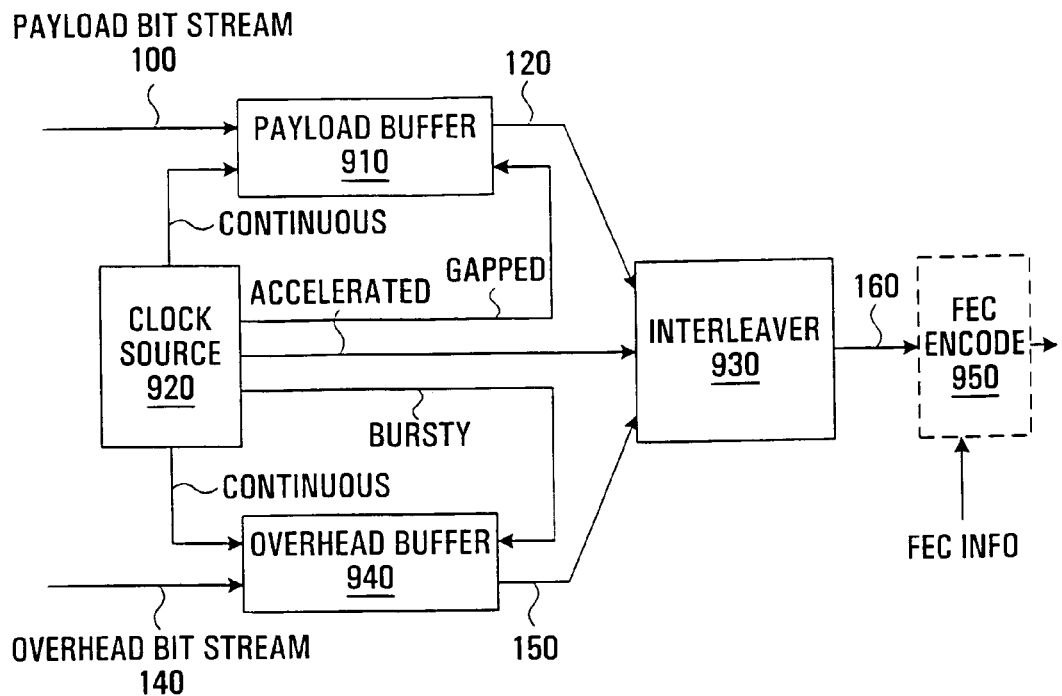
FIG. 9 is a block diagram of a conventional digital wrapper generation system.

FIG. 8 shows a trace of the average signal level of an example sequence of wrapper symbols appearing at the output of a low-bandwidth receiver. Also shown are two decision regions 800, 810, one for logic "zero" and the other for logic "1". The decision region 800 corresponding to logic "zero" is located in the neighbourhood of signal level $V_{AVG,0}$ and the decision region 810 corresponding to logic "one" is located in the neighbourhood of signal level $V_{AVG,1}$.

The two decision regions 800, 810 can be separated by a single threshold located at $(V_L+V_H)/2$ or they can be disjoint from one another and associated with their own respective thresholds. It is within the scope of the invention to use either a single threshold or a dual one. If a single threshold is used, then $(V_L+V_H)/2$ can be defined the signal level above which a measured average signal level denotes receipt of a logic "one" and below which a measured average signal level denotes a logic "zero".

Of course, noise may be introduced into the measurement process, particularly due to the presence of the band-limited payload bit stream at the output of the receiver. This creates a zone of ambiguity wherein the placement of a threshold may lead to unreliable detection results. Improved detection accuracy can be achieved by setting a separate logic "one" detection threshold somewhere in decision region 810 and setting a logic "zero" detection threshold somewhere in decision region 800.

Specifically, for logic "one", the threshold value could be located between the "3-sigma point" of the amplitude distribution of the band-limited payload "noise" and the expected peak signal level of a logic "one". The "3-sigma point" of a noise signal is the level that is three standard deviations away from the average level of the noise signal. In a random Gaussian amplitude signal this level is exceeded approximately for 1E10-7 of the overall time. In a pseudo-Gaussian amplitude signal with truncated "tails", such as the output of an extremely band-limited pseudo-random data generator, the 3-sigma point level is exceeded even less often. Thus, detection of an average signal level above the 3-sigma point could be considered as a strong indication that a logic "one" was received in the overhead bit stream.

Conversely, for logic "zero", the threshold value could be located between the negative of the 3-sigma point of the amplitude distribution of the band-limited payload "noise" and the expected peak signal level of a logic "zero"; detection of an average signal level below this threshold would be considered as a strong indication that a logic "zero" was received in the overhead bit stream.

Thus, it is clear that there exist various trade-offs among (1) the additional increase in the bit rate of the composite signal introduced by the use of an expansion factor; (2) the decrease in bandwidth required by a detector at an intermediate switching or regeneration node; and (3) the reduction in decision threshold margin at the detection stage. The balancing of these three factors is left as an exercise to the individual network designer.

It should be understood that the examples of FIGS. 3A–3C show an expansion factor of 8 or 16 for ease of illustration only, and that in practice the expansion factor may be much larger. As has already been explained, for a given payload bit rate and overhead bit rate, the choice expansion factor has a direct impact on the bandwidth of the wrapper receiver required at an intermediate node. The choice of expansion factor also has an impact on the increase in bandwidth from the payload bit stream to the composite signal.

Specifically, the required receiver bandwidth is 1/N times the bandwidth of the composite (payload+wrapper) signal. In the case of a payload bit rate of 10 Gbps and an overhead bit rate of 1 Mbps, a 100 Mbps receiver can be used for wrapper symbol detection if the expansion factor is equal to 101 or more. With a restriction of 5% on the percent increase in bit rate relative the payload bit rate, the expansion factor is limited to a maximum of 500.

Figure 4:
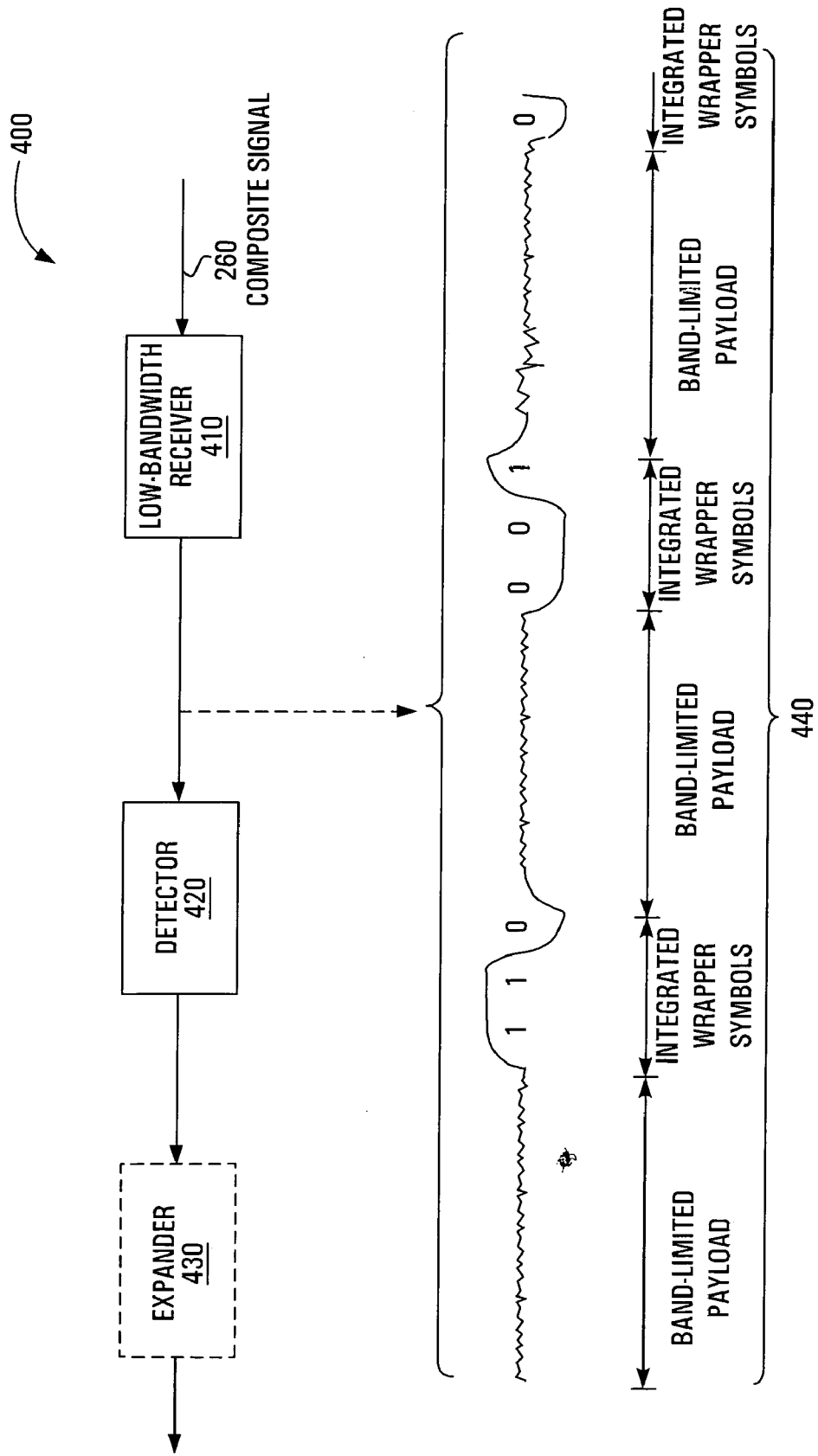
FIG. 4 is a block diagram of a system adapted to extract overhead bit stream from a communications signal having the format shown in FIG. 2.

One way of extracting the control information carried by a composite signal designed in accordance with the above criteria is now described with reference to FIG. 4, wherein is shown an overhead bit stream extraction system 400. The system 400, which can be located at an intermediate node such as a switch or regeneration node, includes a receiver 410 connected to a detector 420, which is connected to an optional expander 430.

The receiver 410 is a low-bandwidth optical receiver which converts a single-wavelength composite optical signal into electrical form. Whereas a receiver capable of decoding the individual wrapper bits in the composite signal 160 of FIG. 1 needs to have a bandwidth as large as the bandwidth of the composite signal 160, the bandwidth of the receiver 410 of the present invention need only be as high as 1/Nth of the bandwidth of the composite signal 260. This reduces the cost, complexity, chip real estate and power consumption associated with the system 400.

Furthermore, by letting the expansion factor "N" be proportional to the payload bit rate before wrapping (for a constant overhead bit rate), a single low-bandwidth receiver can read the wrapper symbols of any composite signal, independent of the payload bit rate. This is significantly different from the conventional digital wrapper solution, wherein each different payload bit rate would require a different high-bandwidth receiver.

A trace of an example signal which may appear at the output of the receiver 410 is shown at 440. The signal 440 contains recurrent low-frequency data bursts in between which are located band-limited payload regions. The low-frequency data bursts contain integrated wrapper symbols which can be distinguished as either ones or zeros depending on their average signal level towards the end of the symbol interval. The band-limited payload regions are the payload segments of the composite signal which have passed through the low-bandwidth receiver 410. The fact that these payload segments turn into what appears to be "noise" regions prevents eavesdropping of the payload bit stream by equipment located deeper within the intermediate node.

The detector 420 is a low-speed wrapper segment finder and overhead bit detector. It therefore performs two functions. Firstly, it operates on the signal 440 to locate the low-frequency data bursts therein. Secondly, once the low-frequency data bursts have been identified, it performs a threshold detection operation for each integrated wrapper symbol in each low-frequency data burst. As previously described, single or dual threshold discrimination could be performed, depending on the operational requirements of the invention.

The expander 430, which is optional, is a low speed overhead bit stream expander. It can be implemented as a first-in first out (FIFO) buffer. Its function is to read the overhead bits upon detection by the detector 420 (i.e., in burst fashion) and to generate a steady stream of overhead bits which are provided to a higher-level processing module (not shown in FIG. 4). In some embodiments, the expander 430 may be integrated within the processing module.

From the above, those skilled in the art will appreciate that if a communications signal is designed in accordance with the above-outlined three properties (1), (2) and (3), the overhead information can be extracted at an intermediate node using an inexpensive low-bandwidth receiver. In addition, the overhead information extraction system need not concern itself with the correct detection of each bit in a wrapper symbol as long as it correctly detects in which of two detection regions the integrated (average) signal level of the wrapper symbol happens to fall.

Figure 5:
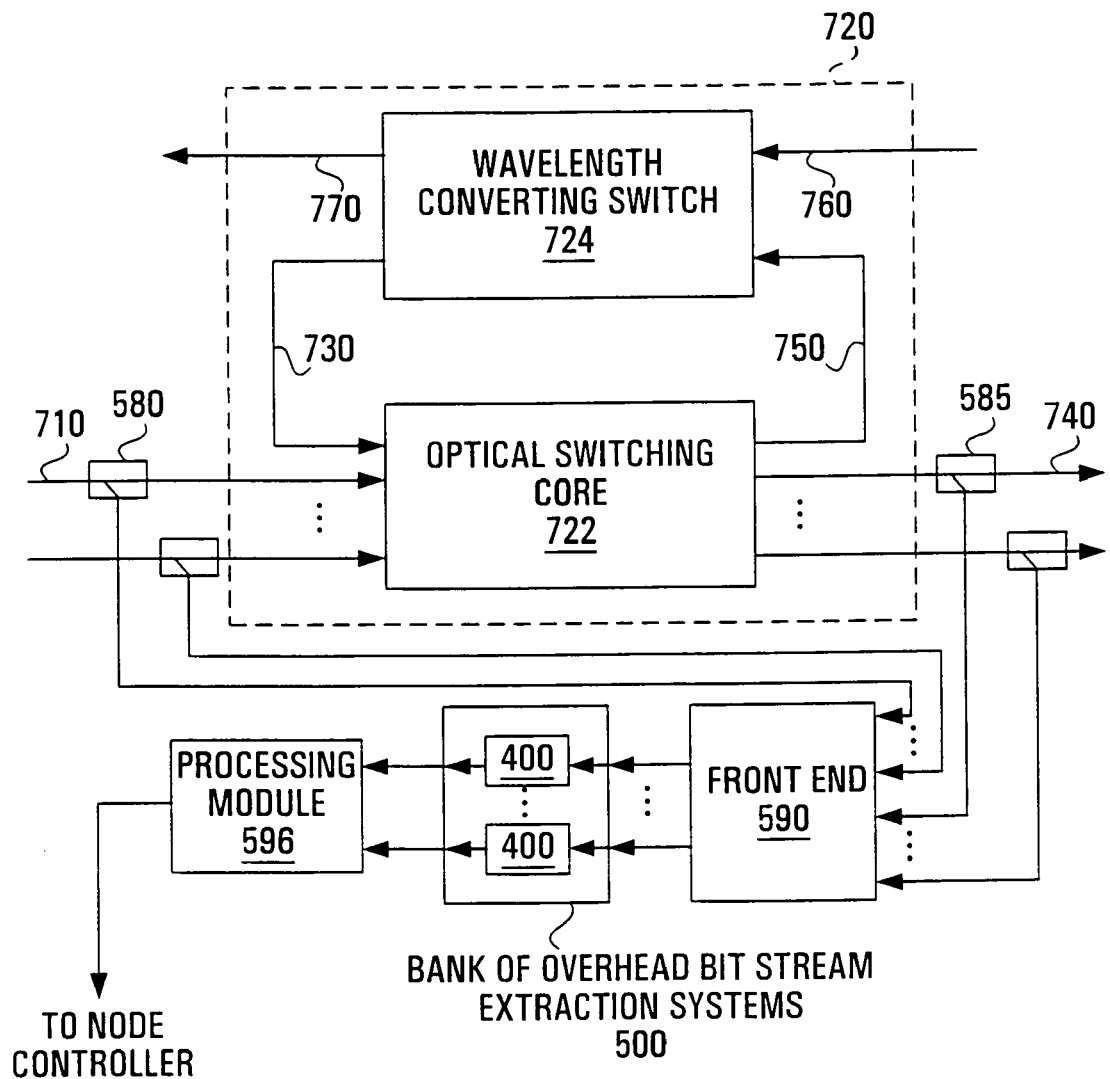
FIG. 5 is a block diagram of a system adapted to process overhead bit stream extracted by the system of FIG. 4.

There exist still other advantages of the present invention which arise by virtue of applying the invention in the context of photonic switching. With reference to FIG. 5, there is shown a system for extracting and processing a plurality of overhead bit streams from a plurality of wavelength division multiplexed (WDM) optical input signals and a plurality of WDM output signals. As was the case in FIG. 7, the WDM input signals arrive at a switching module 720 via a plurality of input optical fibers 710 and the WDM output signals are output by the switching module 720 on a plurality of output optical fibers 740.

Each of the WDM input signals and the WDM output signals contains multiple single-carrier optical signals occupying distinct wavelengths of light. The WDM input signals are switched at the single-carrier level by the switching module 720, which provides mostly optical switching (by means of a photonic switching core) but also some wavelength conversion and electrical switching (by means of a wavelength converting switch). The connection maps applied by the photonic switching core and the wavelength converting switch in the switching module 720 are controlled by a fabric controller (not shown).

Figure 7:
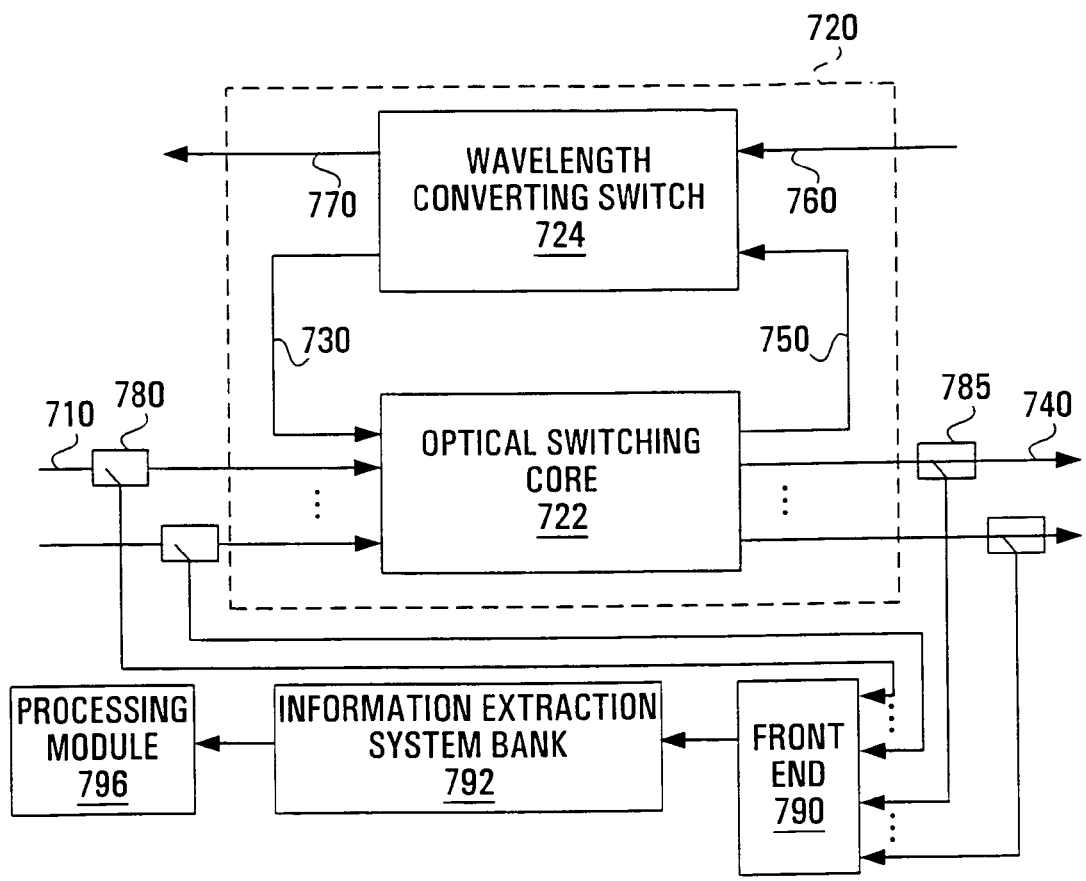
FIG. 7 is a block diagram of a photonic switching node for use in a high-capacity transport network.

The WDM input signals are intercepted by a respective set of optical tap couplers 580, which can be identical to the tap couplers 780 previously described with reference to FIG. 7. Each of the tap couplers 580 diverts a portion of the respective WDM input signal to a common front end 590. Similarly, the WDM output signals are intercepted by a respective set of optical tap couplers 585, each of which diverts a portion of the respective WDM output signal to the common front end 590.

The front end 590 consists of arrangements of optical components which provide the separation of the diverted WDM input and output signals into their single-wavelength components. In order to provide continual monitoring of the overhead information on each wavelength channel, the front end 590 could be embodied simply as an arrangement of parallel wavelength division demultiplexers (one for each of the input and output optical fibers 710, 740). Thus, the front end 590 is greatly simplified with respect to the front end 790 of FIG. 7.

Each of the wavelength channels output by the front end 590 passes through a respective overhead bit stream extraction system 400 in a bank of such systems 500. Each overhead bit stream extraction system can consist of a receiver, detector and expander as previously described. The overhead bit stream extraction systems 400 produce respective ones of a plurality of overhead bit streams which are provided to a processing module 596.

It is noted that receivers and detectors in the overhead bit stream extraction systems 400 operate at a low bandwidth (as low as 1/N times the bandwidth of the composite signal). This results in a significant reduction in complexity, cost, power consumption, chip real estate, etc. In addition, through proper choice of the expansion factor "N" used on the corresponding wavelength channel, the implementation of each system 400 can be made to be independent of the payload bit rate carried by that wavelength channel.

The processing module 596 may be implemented in software, hardware, firmware or a combination thereof. In addition to receiving the extracted input and output overhead bit streams from the systems 400, the processing module 596 also receives the connection maps from the fabric controller. The processing module 596 is further connected to a node controller (not shown) to which it can report status information.

The processing module 596 executes a series of steps which result in overhead information being decoded from the extracted input and output overhead bit streams. In a connection integrity verification scenario, based on the connection maps specified by the fabric controller, the processing module 596 can determine on which output overhead bit streams the overhead information associated with the input overhead bit streams should appear. This is compared to the overhead information which actually appears on the output overhead bit streams, and thus connection integrity can be ascertained. Other overhead information may lead to other control functions being executed by the processing module 596.

Whereas conventional systems employing digital wrappers require the tap couplers 780, 785 (see FIG. 7) to divert a large amount of the optical power of the signal they intercept, the tap couplers 580, 585 in FIG. 5 are allowed to be highly asymmetric such that only a small fraction of the input and output WDM signals is diverted and hence leaving the through signals virtually intact. This is permitted because performance of the receivers in the overhead bit stream extraction systems 400 is dependent on how well each integrated wrapper symbol is detected and not on how well each individual bit in each wrapper symbol is detected.

As already mentioned, the types of control functions which can be performed at a photonic switching node include but are not limited to connection integrity verification. For instance, another useful control function is the capability to equalize the power across the optical spectrum of an output WDM signal. A more detailed description of this functionality can be found in co-pending application Ser. No. 09/580,495.

Figure 6:
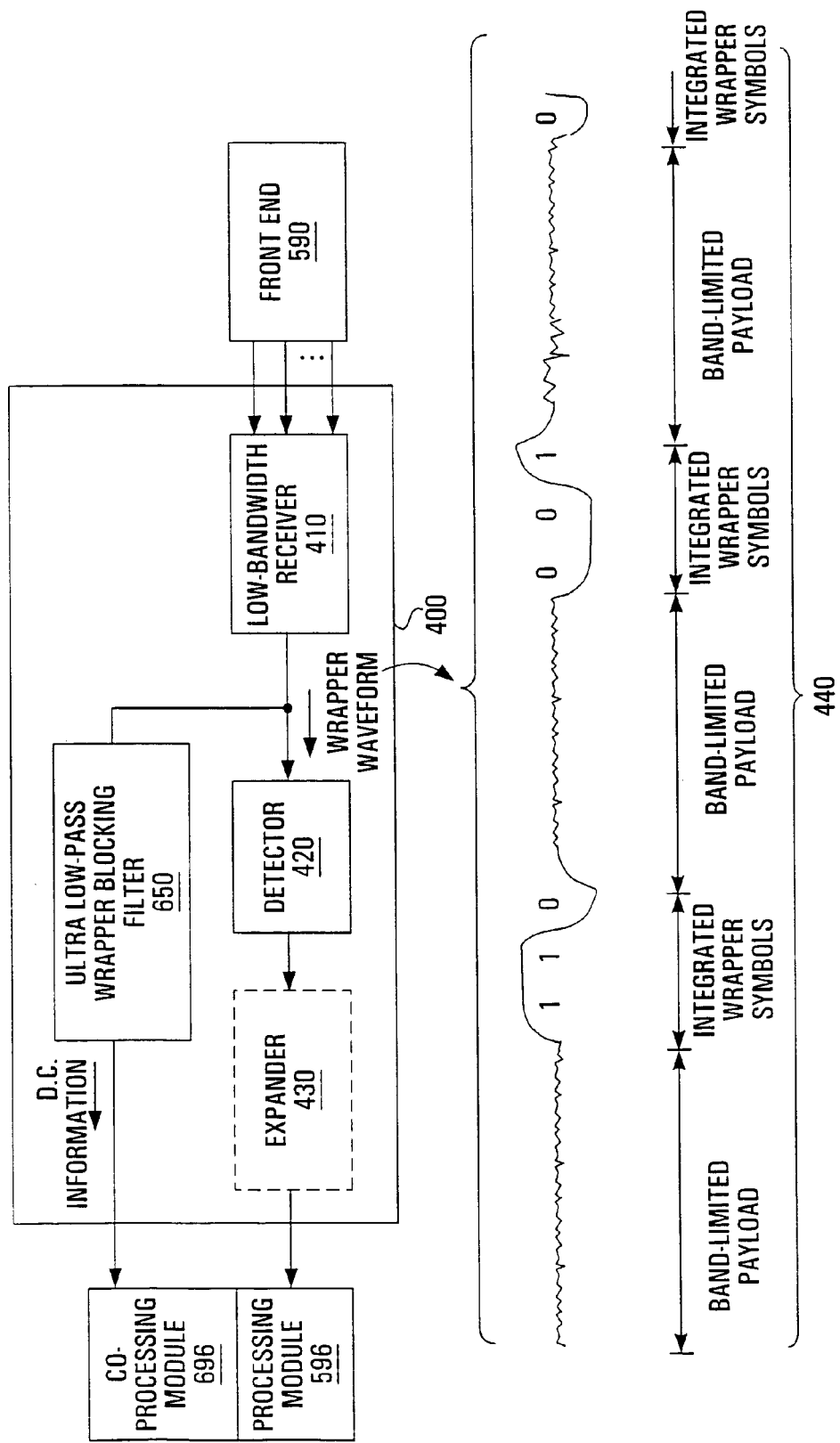
FIG. 6 is a block diagram of part of a system adapted to extract average power level information immediately following opto-electrical conversion.

With reference now to FIG. 6, there is shown part of system which has been adapted to provide the processing module 596 not just with an overhead bit stream being carried on the associated wavelength channel but also with an estimate of the channel's optical power. FIG. 6 shows the overhead bit stream extraction system 400 of FIG. 4 connected to both the processing module 596 of FIG. 5 and to a co-processing module 696. Specifically, the co-processing module 696 is connected to the output of the receiver 410. It is used for power spectrum estimation and equalization and it can be integrated with the processing module 596 or separated therefrom.

An ultra-low-pass wrapper blocking filter 650 can be placed between the output of the receiver 410 and the co-processing module. This filter has a low-frequency cut-off point which suppresses even the wrapper bursts in the composite signal on the associated wavelength channel. Thus, by measuring the average D.C. level of the output of the filter, the co-processing module 696 obtains an estimate of the optical power of the wavelength channel.

Another way to measure the optical power of a wavelength channel is to modify the detector 420 in the overhead bit stream extraction system 400 so that it measures the peak-to-peak value amplitude of the received signal 440 during each wrapper burst. This has the advantage of being immune to any D.C. drift in the receiver 410. Moreover, the result of the peak-to-peak measurement can be used for adapting the detection thresholds of the detector 420, if required. Thus, it should be understood that adaptive thresholds are within the scope of the present invention.

Power spectrum equalization can then be performed through control of a variable optical attenuator (or amplifier) placed in the path of the composite signal, inside the switching module 720 prior to recombination by WDM multiplexing equipment. The use of variable optical intensity controllers in the context of power spectrum equalization is described in greater detail in the above-referenced U.S. patent application Ser. No. 09/580,495.

Of course, it is within the scope of the invention to provide power spectrum estimation and equalization functionality either separately or together with connection verification functionality or any other type of control functionality.

Moreover, those skilled in the art should appreciate that in some embodiments of the invention, all or part of the functionality previously described herein with respect to the receiver 410, detector 420, expander 430, processing module 596 and co-processing module 696 may be implemented as pre-programmed hardware elements (e.g., application specific integrated circuits), or other related components. In other embodiments of the invention, all or part of the functionality previously described herein with respect to the receiver 410, detector 420, expander 430, processing module 596 and co-processing module 696 may be implemented as software consisting of a series of instructions for execution by a computer system.

The series of instructions could be stored on a medium which is fixed, tangible and readable directly by the computer system, (e.g., removable diskette, CD-ROM, ROM, or fixed disk), or the instructions could be stored remotely but transmittable to the computer system via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared or other transmission schemes).

Those skilled in the art should further appreciate that the series of instructions may be written in a number of programming languages for use with many computer architectures or operating systems. For example, some embodiments may be implemented in a procedural programming language (e.g., "C") or an object oriented programming language (e.g., "C++" or "JAVA").

While specific embodiments of the present invention have been described and illustrated, it will be apparent to those skilled in the art that numerous modifications and variations can be made without departing from the scope of the invention as defined in the appended claims.

I claim:

1. A transmission medium conveying a communications signal comprising:
   recurrent wrapper bursts, each wrapper burst comprising one or more wrapper symbols, each wrapper symbol comprising a multi-bit pattern which corresponds to an information bit;
   wherein each wrapper symbol is characterized by a signal level transition pattern, said signal level transition pattern being either a first pattern or a second pattern depending on the logic value of the respective information bit; and
   wherein the first and second patterns each have a distinct average signal level and are each characterized by at least one signal level transition.

2. A transmission medium as claimed in claim 1, wherein the first and second patterns each have a plurality of signal level transitions which are sufficiently densely spaced in time to enable far-end receiver synchronization.

3. A transmission medium as claimed in claim 1, wherein the first and second patterns are complementary.

4. A transmission medium as claimed in claim 1, wherein the first and second patterns each have at least one rising edge and at least one falling edge.

5. A transmission medium as claimed in claim 1, wherein the first pattern has multiple substantially evenly distributed pulses.

6. A transmission medium as claimed in claim 5, wherein the second pattern has multiple substantially evenly distributed recesses.

7. A transmission medium as claimed in claim 1, wherein the communications signal further comprises a payload segment between adjacent wrapper bursts, wherein each wrapper burst has a duration substantially less than the duration of either adjacent payload segment.

8. A transmission medium as claimed in claim 1, wherein the communications signal is an optical signal.

9. A transmission medium as claimed in claim 1, wherein the communications signal is an electrical signal.

10. A transmission medium conveying a communications signal comprising:
    alternating payload and wrapper segments;
    wherein each wrapper segment comprises a contiguity of signal level sequences;

wherein each signal level sequence is a multi-bit symbol characterized by an average signal level indicative of the binary value of a bit of an information bit stream; and wherein each signal level sequence comprises at least one intermediate signal level transition.

11. A transmission medium as claimed in claim 10, wherein the payload and wrapper segments are binary-valued.

12. A transmission medium as claimed in claim 10, wherein each signal level sequence is either a first pattern or a second pattern, depending on the binary value of the respective bit of the information bit stream.

13. A transmission medium as claimed in claim 12, wherein the first and second patterns are complementary.

14. A transmission medium as claimed in claim 12, wherein each of the first and second patterns has at least one rising edge and at least one falling edge.

15. A transmission medium as claimed in claim 12, wherein the first pattern has multiple substantially evenly distributed pulses.

16. A transmission medium as claimed in claim 15, wherein the second pattern has multiple substantially evenly distributed recesses.

17. A transmission medium as claimed in claim 10, wherein each wrapper segment has a duration substantially less than the duration of any adjacent payload segment.

18. A transmission medium as claimed in claim 10, wherein the communications signal is an optical signal.

19. A transmission medium as claimed in claim 10, wherein the communications signal is an electrical signal.

20. A transmission medium conveying a communications signal comprising:

alternating payload and wrapper segments, each wrapper segment consisting of a concatenation of binary signal level patterns;

wherein each binary signal level pattern is associated with a bit of an information bit stream;

wherein each binary signal level pattern is either a first pattern or a second pattern, the first and second patterns being associated with respective ones of two possible logic values for a bit in the information bit stream;

wherein the first pattern consists mostly of a low signal level and partly of a high signal level; and wherein the second pattern consists mostly of the high signal level and partly of the low signal level.

21. A transmission medium conveying a communications signal comprising:

alternating payload and wrapper segments, each wrapper segment comprising a concatenation of pulse groups, each pulse group encoding a bit of an information bit stream;

wherein the pulse sequence which encodes one of two possible logic values for a bit in the overhead bit stream consists of at least one pulse and has a pulse density of strictly less than 50 percent; and wherein the pulse sequence which encodes the other possible logic value for a bit in the information bit stream consists of not all pulses and has a pulse density of strictly more than 50 percent.

22. A method of extracting an overhead bit stream from a composite optical signal consisting of segments of a high-speed data stream alternating with segments of a digital wrapper, each digital wrapper segment containing a plurality of wrapper symbols each of which comprises a multi-bit sequence which has an average signal level indicative of the logical value of a bit in the overhead bit stream, the method comprising the steps of:

converting the composite optical signal into an electrical signal having an electrical bandwidth that is substantially less than the bandwidth of the high-speed data stream;

locating the position of each wrapper segment in the low-bandwidth electrical signal; and detecting individual bits of the overhead bit stream from the average level of the low-bandwidth electrical signal during the located wrapper segments.

23. A method as claimed in claim 22, further comprising:

buffering the bits of the overhead bit stream following detection thereof and outputting said bits periodically at the bit rate of the overhead bit stream.

24. A method as claimed in claim 22, further comprising:

verifying the integrity of a connection map being applied by a switch as a function of the bits in the overhead bit stream.

25. A method as claimed in claim 22, wherein the step of detecting comprises:

for each wrapper symbol interval in each located wrapper segment, measuring an average signal level of the low-bandwidth electrical signal during that wrapper symbol interval;

comparing the measured average signal level to a threshold; and if the measured average signal level is above the threshold, concluding that the corresponding bit in the overhead bit stream is a logic "one" and if the measured average signal level is below the threshold, concluding that the corresponding bit in the overhead bit stream is a logic "zero".

26. A method as claimed in claim 22, wherein the step of detecting comprises:

for each wrapper symbol interval in each located wrapper segment, measuring an average signal level of the low-bandwidth electrical signal during that wrapper symbol interval;

if the measured average signal level is above a first threshold, concluding that the corresponding bit in the overhead bit stream is a logic "one" and if the measured average signal level is below a second threshold less than the first threshold, concluding that the corresponding bit in the overhead bit stream is a logic "zero".

27. A method as claimed in claim 26, wherein the first threshold is located between (1) an expected average signal level of the low-bandwidth electrical signal when the wrapper symbol encodes a logic "one" in the overhead bit stream and (2) the positive three-sigma point of the amplitude distribution of the low-bandwidth electrical signal during the high-speed data stream segments.

28. A method as claimed in claim 26, wherein the second threshold is located between (1) an expected average signal level of the low-bandwidth electrical signal when the wrapper symbol encodes a logic "zero" in the overhead bit stream and (2) the negative three-sigma point of the amplitude distribution of the low-bandwidth electrical signal during the high-speed data stream segments.

29. A method as claimed in claim 22, further comprising:

measuring a peak-to-peak signal level during each wrapper symbol interval in each wrapper segment; and determining from the measured peak-to-peak signal level an average optical intensity of the composite optical signal.

30. A method as claimed in claim 29, further comprising:
comparing the average optical intensity of the composite optical signal to a desired value; and
controlling, as a function of the result of the comparison, the optical intensity of the composite optical signal in a feedback loop.

31. A method as claimed in claim 22, wherein each wrapper symbol is characterized by at least one intermediate signal level transition.

32. A system for extracting an overhead bit stream from an optical signal consisting of segments of a high-speed data stream alternating with segments of a digital wrapper, each digital wrapper segment containing a plurality of wrapper symbols each of which has an average signal level indicative of the logical value of a bit in the overhead bit stream, comprising:
a receiver for converting the composite optical signal into an electrical signal having an electrical bandwidth that is substantially less than the bandwidth of the high-speed data stream;
a wrapper segment identifier connected to the receiver, for locating the position of each wrapper segment in the low-bandwidth electrical signal; and
a detector connected to the wrapper segment identifier, for detecting individual bits of the overhead bit stream from the average level of the low-bandwidth electrical signal during the located wrapper segments.

33. A system as claimed in claim 32, wherein the receiver has a bandwidth which is significantly less than the bit rate of the high-speed data stream.

34. A system as claimed in claim 33, further comprising a low-bandwidth filter connected to the output of the receiver, for providing an estimate of a d.c. level of the electrical signal.

35. A system as claimed in claim 34, wherein the bandwidth of the low-bandwidth filter is less than the rate of the detected wrapper symbols.

36. A system for extracting an overhead bit stream from an optical signal consisting of segments of a high-speed data stream alternating with segments of a digital wrapper, each digital wrapper segment containing a plurality of wrapper symbols each of which has an average signal level indicative of the logical value of a bit in the overhead bit stream, comprising:
means for converting the composite optical signal into an electrical signal having an electrical bandwidth that is substantially less than the bandwidth of the high-speed data stream;
means for locating the position of each wrapper segment in the low-bandwidth electrical signal; and
means for detecting individual bits of the overhead bit stream from the average level of the low-bandwidth electrical signal during the located wrapper segments.

37. A system as claimed in claim 36, wherein the bandwidth of the detecting means is significantly less than the bit rate of the high-speed data stream.

38. A system for extracting a plurality of overhead bit streams from a respective plurality of single-carrier optical signals forming part of a WDM optical signal, each single-carrier optical signal consisting of segments of a high-speed data stream alternating with segments of a digital wrapper, each digital wrapper segment containing a plurality of wrapper symbols each of which has an average signal level indicative of the logical value of a bit in the corresponding overhead bit stream, the system comprising:
an optical tap coupler for coupling a fraction of the optical power of the WDM signal;
a front end connected to the coupler, for separating the WDM signal into the plurality of single-carrier optical signals;
a plurality of receivers connected to the front end, for converting each single-carrier optical signal into a respective electrical signal having a bandwidth that is substantially less than the bandwidth of the corresponding high-speed data stream;
a plurality of wrapper segment identifiers connected to the plurality of receivers, for locating the position of wrapper segments in each low-bandwidth electrical signal; and
a plurality of detectors connected to the plurality of wrapper segment identifiers, for detecting individual bits of the overhead bit streams from the average level of the corresponding low-bandwidth electrical signal during the located wrapper segments.

39. A method of generating a composite communications signal from a payload bit stream and an overhead bit stream, comprising the steps of:
transforming the payload bit stream into a gapped bit stream comprising recurrent gaps; and
transforming the overhead bit stream into a series of bursts which fit into respective ones of the gaps of the gapped bit stream;
wherein the second transforming step includes mapping each overhead bit into a multi-bit wrapper symbol which is represented by either a first signal level transition pattern or a second signal level transition pattern depending on the logical value of the overhead bit; and
wherein the first and second signal level transition patterns each have a distinct average signal level and are each characterized by at least one signal level transition.

40. A method as claimed in claim 39, wherein each overhead bit is mapped to N wrapper bits and wherein N is selected as a function of the bit rate of the payload bit stream and of the bit rate of the overhead bit stream in order to produce wrapper symbols at a rate which is substantially constant irrespective of the bit rate of the payload bit stream.

41. A method as claimed in claim 40, wherein the first and second signal level transition patterns each comprise a plurality of signal level transitions.

42. A method as claimed in claim 41, wherein the signal level transitions in each of the signal level transition patterns occur sufficiently often to satisfy network synchronization constraints.

43. A method as claimed in claim 39, further comprising:
applying forward error correction module to the payload bit stream prior to transforming it into the gapped bit stream.

44. A system for generating a composite communications signal from a payload bit stream and an overhead bit stream, comprising:
a clock source for producing a gapped payload clock signal and a bursty wrapper clock signal;
a payload buffer connected to the clock source, said payload buffer receiving the payload bit stream at a constant rate and being read from at the rate of the gapped payload clock signal, thereby to produce a gapped bit stream comprising recurrent gaps; and
a wrapper symbol coder, for mapping each overhead bit into a wrapper symbol which is represented by either a first signal level transition pattern or a second signal level transition pattern depending on the logical value of the overhead bit and wherein the first and second signal level transition patterns each have a distinct average signal level and are each characterized by at least one signal level transition;

a wrapper buffer connected to the clock source and to the wrapper symbol coder, said wrapper buffer receiving the wrapper symbols at a constant rate and being read from at the rate of the bursty wrapper clock signal, thereby to produce a series of wrapper bursts; and an interleaver connected to the payload buffer and to the wrapper buffer, for inserting the wrapper bursts at the output of the wrapper buffer into respective gaps in the gapped bit stream at the output of the payload buffer.

45. A system as claimed in claim 44, wherein each overhead bit is mapped to N wrapper bits and wherein N is selected as a function of the bit rate of the payload bit stream and of the bit rate of the overhead bit stream in order to produce wrapper symbols at a rate which is substantially constant irrespective of the bit rate of the payload bit stream.

46. A system as claimed in claim 45, wherein the first and second signal level transition patterns each comprise a plurality of signal level transitions.

47. A system as claimed in claim 46, wherein the signal level transitions in each of the signal level transition patterns occur sufficiently often to satisfy network synchronization constraints.

48. A system as claimed in claim 44, further comprising:
a forward error correction module connected at the input of the payload buffer.

49. A system for generating a composite communications signal from a payload bit stream and an overhead bit stream, comprising:
means for transforming the payload bit stream into a gapped bit stream comprising recurrent gaps; and
means for transforming the overhead bit stream into a series of bursts which fit into respective ones of the gaps of the gapped bit stream;
wherein the second transforming step includes mapping each overhead bit into a multi-bit wrapper symbol which is represented by either a first signal level transition pattern or a second signal level transition pattern depending on the logical value of the overhead bit; and
wherein the first and second signal level transition patterns each have a distinct average signal level and are each characterized by at least one signal level transition.

50. A system as claimed in claim 49, wherein each overhead bit is mapped to N wrapper bits, wherein N is selected as a function of the bit rate of the payload bit stream and of the bit rate of the overhead bit stream in order to produce wrapper symbols at a rate which is substantially constant irrespective of the bit rate of the payload bit stream.

51. A system as claimed in claim 50, wherein the first and second signal level transition patterns each comprise a plurality of signal level transitions.

52. A system as claimed in claim 51, wherein the signal level transitions in each of the signal level transition patterns occur sufficiently often to satisfy network synchronization constraints.

53. A system as claimed in claim 49, further comprising:
means for applying forward error correction module to the payload bit stream prior to transforming it into the gapped bit stream.

54. A wrapper symbol coder for mapping each of a plurality of overhead bits into a multi-bit wrapper symbol, the coder being operable to produce either a first signal level transition pattern or a second signal level transition pattern depending on the logical value of each overhead bit, wherein the first and second signal level transition patterns are each characterized by having a distinct average signal level and are each further characterized by at least one signal level transition.

55. A method of generating a composite communications signal from a payload bit stream and an overhead bit stream, comprising the steps of:
transforming the payload bit stream into a gapped bit stream comprising recurrent gaps; and
transforming the overhead bit stream into a series of wrapper bursts which fit into respective ones of the gaps of the gapped bit stream;
wherein the second transforming step includes mapping each overhead bit into one of two possible wrapper symbols, each of which is a set of "N" wrapper bits which are arranged in a pattern that depends on the logic value of the overhead bit, wherein N is an integer greater than 1.

56. The method as claimed in claim 55 wherein the composite signal has an expanded bit rate, wherein the percent increase in the bit rate of the composite signal (denoted "INCREASE") is related to the expansion factor "N", to the bit rate of the payload bit stream (denoted "$BW_P$") and to the bit rate of the overhead bit stream (denoted "$BW_O$") in the following manner:

$$INCREASE=100\times(BW_P+(N\times BW_O))/BW_P.$$

57. The method as claimed in claim 56 wherein the two possible wrapper symbols, when integrated over a symbol period, have a sufficiently distinct average value to allow a low-bandwidth receiver to distinguish between them.

58. The method as claimed in claim 57 wherein said low-bandwidth receiver receiver has a low-pass characteristic having a cut-off point at 1/Nth the bandwidth of the composite signal.

59. The method as claimed in claim 57 wherein the each of the two possible wrapper symbols has one or more signal level transitions located between the start and end of the symbol.

* * * * *